United States Patent
Nanu et al.

(10) Patent No.: US 7,970,184 B2
(45) Date of Patent: Jun. 28, 2011

(54) TWO STAGE DETECTION FOR PHOTOGRAPHIC EYE ARTIFACTS

(75) Inventors: Florin Nanu, Bucharest (RO); Adrian Capata, Bucharest (RO); Eran Steinberg, San Francisco, CA (US); Peter Corcoran, Claregalway (IE); Petronel Bigioi, Galway (IE); Alexei Pososin, Galway (IE); Mihai Ciuc, Bucharest (RO)

(73) Assignee: Tessera Technologies Ireland Limited, Galway (IE)

( * ) Notice: Subject to any disclaimer, the term of this patent is extended or adjusted under 35 U.S.C. 154(b) by 0 days.

(21) Appl. No.: 12/952,167

(22) Filed: Nov. 22, 2010

(65) Prior Publication Data

US 2011/0090363 A1   Apr. 21, 2011

Related U.S. Application Data

(60) Division of application No. 11/462,035, filed on Aug. 2, 2006, now Pat. No. 7,920,723, which is a continuation-in-part of application No. 11/282,954, filed on Nov. 18, 2005, now Pat. No. 7,689,009.

(51) Int. Cl.
*G06K 9/00* (2006.01)

(52) U.S. Cl. ........ 382/117; 382/118; 382/115; 382/128; 382/130; 382/275; 382/167; 348/207.1; 348/241; 348/231.3; 348/243

(58) Field of Classification Search .................. 382/117, 382/118, 115, 128, 130, 275, 167; 348/207.1, 348/241, 132.3, 242
See application file for complete search history.

(56) References Cited

U.S. PATENT DOCUMENTS

| | | | |
|---|---|---|---|
| 4,285,588 A | 8/1981 | Mir | |
| 4,577,219 A | 3/1986 | Klie et al. | |
| 4,646,134 A | 2/1987 | Komatsu et al. | |
| 4,777,620 A | 10/1988 | Shimoni et al. | |
| 4,881,067 A | 11/1989 | Watanabe et al. | |
| 4,978,989 A | 12/1990 | Nakano et al. | |
| 5,016,107 A | 5/1991 | Sasson et al. | |
| 5,070,355 A | 12/1991 | Inoue et al. | |
| 5,130,789 A | 7/1992 | Dobbs et al. | |
| 5,164,831 A | 11/1992 | Kuchta et al. | |
| 5,164,833 A | 11/1992 | Aoki | |
| 5,202,720 A | 4/1993 | Fujino et al. | |
| 5,227,837 A | 7/1993 | Terashita | |
| 5,231,674 A | 7/1993 | Cleveland et al. | |

(Continued)

FOREIGN PATENT DOCUMENTS

EP   884694 A1   12/1998

(Continued)

OTHER PUBLICATIONS

Final Office Action mailed Feb. 1, 2011, for U.S. Appl. No. 10/773,092, filed Feb. 4, 2004.

(Continued)

*Primary Examiner* — Mike Rahmjoo
(74) *Attorney, Agent, or Firm* — Andrew V. Smith

(57) ABSTRACT

A digital image acquisition device is for acquiring digital images including one or more preview images. A face detector analyzes the one or more preview images to ascertain information relating to candidate face regions therein. A speed-optimized filter produces a first set of candidate red-eye regions based on the candidate face region information provided by the face detector.

19 Claims, 12 Drawing Sheets

U.S. PATENT DOCUMENTS

| | | |
|---|---|---|
| 5,249,053 A | 9/1993 | Jain |
| 5,274,457 A | 12/1993 | Kobayashi et al. |
| 5,301,026 A | 4/1994 | Lee |
| 5,303,049 A | 4/1994 | Ejima et al. |
| 5,335,072 A | 8/1994 | Tanaka et al. |
| 5,384,601 A | 1/1995 | Yamashita et al. |
| 5,400,113 A | 3/1995 | Sosa et al. |
| 5,424,794 A | 6/1995 | McKay |
| 5,432,863 A | 7/1995 | Benati et al. |
| 5,432,866 A | 7/1995 | Sakamoto |
| 5,438,367 A | 8/1995 | Yamamoto et al. |
| 5,452,048 A | 9/1995 | Edgar |
| 5,455,606 A | 10/1995 | Keeling et al. |
| 5,537,516 A | 7/1996 | Sherman et al. |
| 5,568,187 A | 10/1996 | Okino |
| 5,568,194 A | 10/1996 | Abe |
| 5,649,238 A | 7/1997 | Wakabayashi et al. |
| 5,671,013 A | 9/1997 | Nakao |
| 5,678,073 A | 10/1997 | Stephenson, III et al. |
| 5,694,926 A | 12/1997 | Devries et al. |
| 5,708,866 A | 1/1998 | Leonard |
| 5,719,639 A | 2/1998 | Imamura |
| 5,719,951 A | 2/1998 | Shackleton et al. |
| 5,721,983 A | 2/1998 | Furutsu |
| 5,724,456 A | 3/1998 | Boyack et al. |
| 5,734,425 A | 3/1998 | Takizawa et al. |
| 5,748,764 A | 5/1998 | Benati et al. |
| 5,748,784 A | 5/1998 | Sugiyama |
| 5,751,836 A | 5/1998 | Wildes et al. |
| 5,761,550 A | 6/1998 | Kancigor |
| 5,781,650 A | 7/1998 | Lobo et al. |
| 5,805,720 A | 9/1998 | Suenaga et al. |
| 5,805,727 A | 9/1998 | Nakano |
| 5,805,745 A | 9/1998 | Graf |
| 5,815,749 A | 9/1998 | Tsukahara et al. |
| 5,818,975 A | 10/1998 | Goodwin et al. |
| 5,847,714 A | 12/1998 | Naqvi et al. |
| 5,850,470 A | 12/1998 | Kung et al. |
| 5,862,217 A | 1/1999 | Steinberg et al. |
| 5,862,218 A | 1/1999 | Steinberg |
| 5,892,837 A | 4/1999 | Luo et al. |
| 5,949,904 A | 9/1999 | Delp |
| 5,974,189 A | 10/1999 | Nicponski |
| 5,990,973 A | 11/1999 | Sakamoto |
| 5,991,456 A | 11/1999 | Rahman et al. |
| 5,991,549 A | 11/1999 | Tsuchida |
| 5,991,594 A | 11/1999 | Froeber et al. |
| 5,999,160 A | 12/1999 | Kitamura et al. |
| 6,006,039 A | 12/1999 | Steinberg et al. |
| 6,009,209 A | 12/1999 | Acker et al. |
| 6,011,547 A | 1/2000 | Shiota et al. |
| 6,016,354 A | 1/2000 | Lin et al. |
| 6,028,611 A | 2/2000 | Anderson et al. |
| 6,035,072 A | 3/2000 | Read |
| 6,035,074 A | 3/2000 | Fujimoto et al. |
| 6,036,072 A | 3/2000 | Lee |
| 6,101,271 A | 8/2000 | Yamashita et al. |
| 6,104,839 A | 8/2000 | Cok et al. |
| 6,118,485 A | 9/2000 | Hinoue et al. |
| 6,134,339 A | 10/2000 | Luo |
| 6,151,403 A | 11/2000 | Luo |
| 6,172,706 B1 | 1/2001 | Tatsumi |
| 6,192,149 B1 | 2/2001 | Eschbach et al. |
| 6,195,127 B1 | 2/2001 | Sugimoto |
| 6,201,571 B1 | 3/2001 | Ota |
| 6,204,858 B1 | 3/2001 | Gupta |
| 6,204,868 B1 | 3/2001 | Yamauchi et al. |
| 6,233,364 B1 | 5/2001 | Krainiouk et al. |
| 6,249,315 B1 | 6/2001 | Holm |
| 6,252,976 B1 | 6/2001 | Schildkraut et al. |
| 6,266,054 B1 | 7/2001 | Lawton et al. |
| 6,268,939 B1 | 7/2001 | Klassen et al. |
| 6,275,614 B1 | 8/2001 | Krishnamurthy et al. |
| 6,278,491 B1 | 8/2001 | Wang et al. |
| 6,285,410 B1 | 9/2001 | Marni |
| 6,292,574 B1 | 9/2001 | Schildkraut et al. |
| 6,295,378 B1 | 9/2001 | Kitakado et al. |
| 6,298,166 B1 | 10/2001 | Ratnakar et al. |
| 6,300,935 B1 | 10/2001 | Sobel et al. |
| 6,381,345 B1 | 4/2002 | Swain |
| 6,393,148 B1 | 5/2002 | Bhaskar |
| 6,396,963 B2 | 5/2002 | Shaffer et al. |
| 6,407,777 B1 | 6/2002 | Deluca |
| 6,421,468 B1 | 7/2002 | Ratnakar et al. |
| 6,426,775 B1 | 7/2002 | Kurokawa |
| 6,429,924 B1 | 8/2002 | Milch |
| 6,433,818 B1 | 8/2002 | Steinberg et al. |
| 6,438,264 B1 | 8/2002 | Gallagher et al. |
| 6,441,854 B2 | 8/2002 | Fellegara et al. |
| 6,459,436 B1 | 10/2002 | Kumada et al. |
| 6,473,199 B1 | 10/2002 | Gilman et al. |
| 6,496,655 B1 | 12/2002 | Desormeaux |
| 6,501,911 B1 | 12/2002 | Desormeaux |
| 6,505,003 B1 | 1/2003 | Desormeaux |
| 6,510,520 B1 | 1/2003 | Steinberg |
| 6,516,154 B1 | 2/2003 | Parulski et al. |
| 6,614,471 B1 | 9/2003 | Ott |
| 6,614,995 B2 | 9/2003 | Tseng |
| 6,621,867 B1 | 9/2003 | Sazzad et al. |
| 6,628,833 B1 | 9/2003 | Horie |
| 6,631,208 B1 | 10/2003 | Kinjo et al. |
| 6,700,614 B1 | 3/2004 | Hata |
| 6,707,950 B1 | 3/2004 | Burns et al. |
| 6,714,665 B1 * | 3/2004 | Hanna et al. .................. 382/117 |
| 6,718,051 B1 | 4/2004 | Eschbach |
| 6,724,941 B1 | 4/2004 | Aoyama |
| 6,728,401 B1 | 4/2004 | Hardeberg |
| 6,765,686 B2 | 7/2004 | Maruoka |
| 6,786,655 B2 | 9/2004 | Cook et al. |
| 6,792,161 B1 | 9/2004 | Imaizumi et al. |
| 6,798,913 B2 | 9/2004 | Toriyama |
| 6,859,565 B2 | 2/2005 | Baron |
| 6,873,743 B2 | 3/2005 | Steinberg |
| 6,885,766 B2 | 4/2005 | Held et al. |
| 6,895,112 B2 | 5/2005 | Chen et al. |
| 6,900,882 B2 | 5/2005 | Iida |
| 6,912,298 B1 | 6/2005 | Wilensky |
| 6,937,997 B1 | 8/2005 | Parulski |
| 6,967,680 B1 | 11/2005 | Kagle et al. |
| 6,980,691 B2 | 12/2005 | Nesterov et al. |
| 6,984,039 B2 | 1/2006 | Agostinelli |
| 7,024,051 B2 | 4/2006 | Miller et al. |
| 7,027,662 B2 | 4/2006 | Baron |
| 7,030,927 B2 | 4/2006 | Sasaki |
| 7,035,461 B2 | 4/2006 | Luo et al. |
| 7,035,462 B2 | 4/2006 | White et al. |
| 7,042,501 B1 | 5/2006 | Matama |
| 7,042,505 B1 | 5/2006 | Deluca |
| 7,062,086 B2 | 6/2006 | Chen et al. |
| 7,116,820 B2 | 10/2006 | Luo et al. |
| 7,133,070 B2 | 11/2006 | Wheeler et al. |
| 7,155,058 B2 | 12/2006 | Gaubatz et al. |
| 7,171,044 B2 | 1/2007 | Chen et al. |
| 7,216,289 B2 | 5/2007 | Kagle et al. |
| 7,224,850 B2 | 5/2007 | Zhang et al. |
| 7,269,292 B2 | 9/2007 | Steinberg |
| 7,289,664 B2 | 10/2007 | Enomoto |
| 7,295,233 B2 | 11/2007 | Steinberg et al. |
| 7,310,443 B1 | 12/2007 | Kris et al. |
| 7,315,631 B1 | 1/2008 | Corcoran et al. |
| 7,336,821 B2 | 2/2008 | Ciuc et al. |
| 7,352,394 B1 | 4/2008 | DeLuca et al. |
| 7,362,368 B2 | 4/2008 | Steinberg et al. |
| 7,369,712 B2 | 5/2008 | Steinberg et al. |
| 7,403,643 B2 | 7/2008 | Ianculescu et al. |
| 7,436,998 B2 | 10/2008 | Steinberg et al. |
| 7,454,040 B2 | 11/2008 | Luo et al. |
| 7,515,740 B2 | 4/2009 | Corcoran et al. |
| 7,738,015 B2 | 6/2010 | Steinberg et al. |
| 2001/0015760 A1 | 8/2001 | Fellegara et al. |
| 2001/0031142 A1 | 10/2001 | Whiteside |
| 2001/0052937 A1 | 12/2001 | Suzuki |
| 2002/0019859 A1 | 2/2002 | Watanabe |
| 2002/0041329 A1 | 4/2002 | Steinberg |
| 2002/0051571 A1 | 5/2002 | Jackway et al. |
| 2002/0054224 A1 | 5/2002 | Wasula et al. |
| 2002/0085088 A1 | 7/2002 | Eubanks |

| | | | | | |
|---|---|---|---|---|---|
| 2002/0090133 A1 | 7/2002 | Kim et al. | 2005/0013602 A1 | 1/2005 | Ogawa |
| 2002/0093577 A1 | 7/2002 | Kitawaki et al. | 2005/0013603 A1 | 1/2005 | Ichimasa |
| 2002/0093633 A1 | 7/2002 | Milch | 2005/0024498 A1 | 2/2005 | Iida et al. |
| 2002/0105662 A1 | 8/2002 | Patton et al. | 2005/0031224 A1 | 2/2005 | Prilutsky et al. |
| 2002/0114513 A1 | 8/2002 | Hirao | 2005/0041121 A1 | 2/2005 | Steinberg et al. |
| 2002/0126893 A1 | 9/2002 | Held et al. | 2005/0046730 A1 | 3/2005 | Li |
| 2002/0131770 A1 | 9/2002 | Meier et al. | 2005/0047655 A1 | 3/2005 | Luo et al. |
| 2002/0136450 A1 | 9/2002 | Chen et al. | 2005/0047656 A1 | 3/2005 | Luo et al. |
| 2002/0141661 A1 | 10/2002 | Steinberg | 2005/0053279 A1 | 3/2005 | Chen et al. |
| 2002/0150292 A1 | 10/2002 | O'callaghan | 2005/0058340 A1 | 3/2005 | Chen et al. |
| 2002/0150306 A1 | 10/2002 | Baron | 2005/0058342 A1 | 3/2005 | Chen et al. |
| 2002/0159630 A1 | 10/2002 | Buzuloiu et al. | 2005/0062856 A1 | 3/2005 | Matsushita |
| 2002/0172419 A1 | 11/2002 | Lin et al. | 2005/0063083 A1 | 3/2005 | Dart et al. |
| 2002/0176623 A1 | 11/2002 | Steinberg | 2005/0068452 A1 | 3/2005 | Steinberg et al. |
| 2003/0007687 A1 | 1/2003 | Nesterov et al. | 2005/0074164 A1 | 4/2005 | Yonaha |
| 2003/0021478 A1 | 1/2003 | Yoshida | 2005/0074179 A1 | 4/2005 | Wilensky |
| 2003/0025808 A1 | 2/2003 | Parulski et al. | 2005/0078191 A1 | 4/2005 | Battles |
| 2003/0025811 A1 | 2/2003 | Keelan et al. | 2005/0117132 A1 | 6/2005 | Agostinelli |
| 2003/0044063 A1 | 3/2003 | Meckes et al. | 2005/0129331 A1 | 6/2005 | Kakiuchi et al. |
| 2003/0044070 A1 | 3/2003 | Fuersich et al. | 2005/0134719 A1 | 6/2005 | Beck |
| 2003/0044176 A1 | 3/2003 | Saitoh | 2005/0140801 A1 | 6/2005 | Prilutsky et al. |
| 2003/0044177 A1 | 3/2003 | Oberhardt et al. | 2005/0147278 A1 | 7/2005 | Rui et al. |
| 2003/0044178 A1 | 3/2003 | Oberhardt et al. | 2005/0151943 A1 | 7/2005 | Iida |
| 2003/0052991 A1 | 3/2003 | Stavely et al. | 2005/0163498 A1 | 7/2005 | Battles et al. |
| 2003/0058343 A1 | 3/2003 | Katayama | 2005/0168965 A1 | 8/2005 | Yoshida |
| 2003/0058349 A1 | 3/2003 | Takemoto | 2005/0196067 A1 | 9/2005 | Gallagher et al. |
| 2003/0086134 A1 | 5/2003 | Enomoto | 2005/0200736 A1 | 9/2005 | Ito |
| 2003/0095197 A1* | 5/2003 | Wheeler et al. ............... 348/241 | 2005/0207649 A1 | 9/2005 | Enomoto et al. |
| 2003/0107649 A1 | 6/2003 | Flickner et al. | 2005/0212955 A1 | 9/2005 | Craig et al. |
| 2003/0113035 A1 | 6/2003 | Cahill et al. | 2005/0219385 A1 | 10/2005 | Terakawa |
| 2003/0118216 A1 | 6/2003 | Goldberg | 2005/0219608 A1 | 10/2005 | Wada |
| 2003/0137597 A1 | 7/2003 | Sakamoto et al. | 2005/0220346 A1 | 10/2005 | Akahori |
| 2003/0142285 A1 | 7/2003 | Enomoto | 2005/0220347 A1 | 10/2005 | Enomoto et al. |
| 2003/0161506 A1 | 8/2003 | Velazquez et al. | 2005/0226499 A1 | 10/2005 | Terakawa |
| 2003/0190072 A1 | 10/2003 | Adkins et al. | 2005/0232490 A1 | 10/2005 | Itagaki et al. |
| 2003/0194143 A1 | 10/2003 | Iida | 2005/0238217 A1 | 10/2005 | Enomoto et al. |
| 2003/0202715 A1 | 10/2003 | Kinjo | 2005/0238230 A1 | 10/2005 | Yoshida |
| 2004/0017481 A1 | 1/2004 | Takasumi et al. | 2005/0243348 A1 | 11/2005 | Yonaha |
| 2004/0027593 A1 | 2/2004 | Wilkins | 2005/0275734 A1 | 12/2005 | Ikeda |
| 2004/0032512 A1 | 2/2004 | Silverbrook | 2005/0276481 A1 | 12/2005 | Enomoto |
| 2004/0032526 A1 | 2/2004 | Silverbrook | 2005/0280717 A1 | 12/2005 | Sugimoto |
| 2004/0033071 A1 | 2/2004 | Kubo | 2005/0286766 A1 | 12/2005 | Ferman |
| 2004/0037460 A1 | 2/2004 | Luo et al. | 2006/0008171 A1 | 1/2006 | Petschnigg et al. |
| 2004/0041924 A1 | 3/2004 | White et al. | 2006/0017825 A1 | 1/2006 | Thakur |
| 2004/0046878 A1 | 3/2004 | Jarman | 2006/0038916 A1 | 2/2006 | Knoedgen et al. |
| 2004/0047491 A1 | 3/2004 | Rydbeck | 2006/0039690 A1 | 2/2006 | Steinberg et al. |
| 2004/0056975 A1 | 3/2004 | Hata | 2006/0045352 A1 | 3/2006 | Gallagher |
| 2004/0057623 A1 | 3/2004 | Schuhrke et al. | 2006/0050300 A1 | 3/2006 | Mitani et al. |
| 2004/0057705 A1 | 3/2004 | Kohno | 2006/0066628 A1 | 3/2006 | Brodie et al. |
| 2004/0057715 A1 | 3/2004 | Tsuchida et al. | 2006/0082847 A1 | 4/2006 | Sugimoto |
| 2004/0090461 A1 | 5/2004 | Adams | 2006/0093212 A1 | 5/2006 | Steinberg et al. |
| 2004/0093432 A1 | 5/2004 | Luo et al. | 2006/0093213 A1 | 5/2006 | Steinberg et al. |
| 2004/0114796 A1 | 6/2004 | Kaku | 2006/0093238 A1 | 5/2006 | Steinberg et al. |
| 2004/0114797 A1 | 6/2004 | Meckes | 2006/0098867 A1 | 5/2006 | Gallagher |
| 2004/0114829 A1 | 6/2004 | LeFeuvre et al. | 2006/0098875 A1 | 5/2006 | Sugimoto |
| 2004/0114904 A1 | 6/2004 | Sun et al. | 2006/0119832 A1 | 6/2006 | Iida |
| 2004/0119851 A1 | 6/2004 | Kaku | 2006/0120599 A1 | 6/2006 | Steinberg et al. |
| 2004/0120598 A1 | 6/2004 | Feng | 2006/0126938 A1 | 6/2006 | Lee et al. |
| 2004/0125387 A1 | 7/2004 | Nagao et al. | 2006/0140455 A1 | 6/2006 | Costache et al. |
| 2004/0126086 A1 | 7/2004 | Nakamura et al. | 2006/0150089 A1 | 7/2006 | Jensen et al. |
| 2004/0141657 A1 | 7/2004 | Jarman | 2006/0203108 A1 | 9/2006 | Steinberg et al. |
| 2004/0150743 A1 | 8/2004 | Schinner | 2006/0204052 A1 | 9/2006 | Yokouchi |
| 2004/0160517 A1 | 8/2004 | Iida | 2006/0204110 A1 | 9/2006 | Steinberg et al. |
| 2004/0165215 A1 | 8/2004 | Raguet et al. | 2006/0221408 A1 | 10/2006 | Fukuda |
| 2004/0184044 A1 | 9/2004 | Kolb et al. | 2006/0285754 A1 | 12/2006 | Steinberg et al. |
| 2004/0184670 A1 | 9/2004 | Jarman et al. | 2007/0110305 A1 | 5/2007 | Corcoran et al. |
| 2004/0196292 A1 | 10/2004 | Okamura | 2007/0116379 A1 | 5/2007 | Corcoran et al. |
| 2004/0196503 A1 | 10/2004 | Kurtenbach et al. | 2007/0116380 A1 | 5/2007 | Ciuc et al. |
| 2004/0213476 A1 | 10/2004 | Luo et al. | 2007/0133863 A1 | 6/2007 | Sakai et al. |
| 2004/0223063 A1 | 11/2004 | Deluca et al. | 2007/0154189 A1 | 7/2007 | Harradine et al. |
| 2004/0227978 A1 | 11/2004 | Enomoto | 2007/0201724 A1 | 8/2007 | Steinberg et al. |
| 2004/0228542 A1 | 11/2004 | Zhang et al. | 2007/0263104 A1 | 11/2007 | Deluca et al. |
| 2004/0233299 A1 | 11/2004 | Ioffe et al. | 2007/0263928 A1 | 11/2007 | Akahori |
| 2004/0233301 A1 | 11/2004 | Nakata et al. | 2008/0002060 A1 | 1/2008 | Deluca et al. |
| 2004/0234156 A1 | 11/2004 | Watanabe et al. | 2008/0013798 A1 | 1/2008 | Ionita et al. |
| 2004/0239779 A1 | 12/2004 | Washisu | 2008/0043121 A1 | 2/2008 | Prilutsky et al. |
| 2004/0240747 A1 | 12/2004 | Jarman et al. | 2008/0112599 A1 | 5/2008 | Nanu et al. |
| 2004/0258308 A1 | 12/2004 | Sadovsky et al. | 2008/0144965 A1 | 6/2008 | Steinberg et al. |
| 2005/0001024 A1 | 1/2005 | Kusaka et al. | 2008/0186389 A1 | 8/2008 | Deluca et al. |

| | | | |
|---|---|---|---|
| 2008/0211937 | A1 | 9/2008 | Steinberg et al. |
| 2008/0232711 | A1 | 9/2008 | Prilutsky et al. |
| 2008/0240555 | A1 | 10/2008 | Nanu et al. |

FOREIGN PATENT DOCUMENTS

| | | |
|---|---|---|
| EP | 911759 A2 | 4/1999 |
| EP | 911759 A3 | 6/2000 |
| EP | 1199672 A2 | 4/2002 |
| EP | 1229486 A1 | 8/2002 |
| EP | 1288858 A1 | 3/2003 |
| EP | 1288859 A1 | 3/2003 |
| EP | 1288860 A1 | 3/2003 |
| EP | 1293933 A1 | 3/2003 |
| EP | 1296510 A2 | 3/2003 |
| EP | 1429290 A2 | 6/2004 |
| EP | 1478169 A2 | 11/2004 |
| EP | 1528509 A2 | 5/2005 |
| EP | 979487 B1 | 3/2006 |
| EP | 1429290 B1 | 7/2008 |
| GB | 841609 A | 7/1960 |
| GB | 2379819 A | 3/2003 |
| JP | 3205989 A2 | 9/1991 |
| JP | 4192681 A2 | 7/1992 |
| JP | 5224271 A2 | 9/1993 |
| JP | 7281285 A2 | 10/1995 |
| JP | 9214839 A2 | 8/1997 |
| JP | 2000-134486 A2 | 5/2000 |
| JP | 2002-247596 A2 | 8/2002 |
| JP | 2002-271808 A2 | 9/2002 |
| JP | 2003-030647 A2 | 1/2003 |
| WO | WO9802844 A1 | 1/1998 |
| WO | WO9917254 A1 | 4/1999 |
| WO | WO9933684 A2 | 7/1999 |
| WO | WO0171421 A1 | 9/2001 |
| WO | WO0192614 A1 | 12/2001 |
| WO | WO0245003 A1 | 6/2002 |
| WO | WO03026278 A1 | 3/2003 |
| WO | WO03071484 A1 | 8/2003 |
| WO | WO2004034696 A1 | 4/2004 |
| WO | WO2005015896 A1 | 2/2005 |
| WO | WO2005041558 A1 | 5/2005 |
| WO | WO2005076217 A2 | 8/2005 |
| WO | WO2005076217 A3 | 8/2005 |
| WO | WO2005087994 A1 | 9/2005 |
| WO | WO2005109853 A1 | 11/2005 |
| WO | WO2006011635 A1 | 2/2006 |
| WO | WO2006018056 A1 | 2/2006 |
| WO | WO2006045441 A1 | 5/2006 |
| WO | WO2007057063 A1 | 5/2007 |
| WO | WO2007057064 A1 | 5/2007 |
| WO | WO2007093199 A2 | 8/2007 |
| WO | WO2007093199 A3 | 8/2007 |
| WO | WO2007095553 A2 | 8/2007 |
| WO | WO2007095553 A3 | 8/2007 |
| WO | WO2007142621 A1 | 12/2007 |
| WO | WO2008023280 A2 | 2/2008 |
| WO | WO2008109644 A2 | 9/2008 |
| WO | WO2008109644 A3 | 9/2008 |
| WO | WO2010017953 A1 | 2/2010 |
| WO | WO2010025908 A1 | 3/2010 |

OTHER PUBLICATIONS

Final Office Action mailed Feb. 2, 2011, for U.S. Appl. No. 12/613,457, filed Nov. 5, 2009.
Final Office Action mailed Feb. 16, 2011, for U.S. Appl. No. 12/543,405, filed Aug. 18, 2009.
Final Office Action mailed Jan. 5, 2011, for U.S. Appl. No. 12/611,387, filed Nov. 3, 2009.
Non-Final Office Action mailed Mar. 9, 2010, for U.S. Appl. No. 12/192,897, filed Aug. 15, 2008.
Non-Final Office Action mailed Nov. 30, 2010, for U.S. Appl. No. 11/861,257, filed Sep. 25, 2007.
Notice of Allowance mailed Dec. 10, 2010, for U.S. Appl. No. 11/462,035, filed Aug. 2, 2006.
Notice of Allowance mailed Feb. 4, 2011, for U.S. Appl. No. 12/611,387, filed Nov. 3, 2009.
PCT International Search Report and the Written Opinion of the International Searching Authority, for PCT Application No. PCT/EP2004/0008706, dated Nov. 19, 2004, 9 pages.
PCT International Search Report and the Written Opinion of the International Searching Authority, for PCT Application No. PCT/EP2005/0001171, dated Jan. 27, 2006, 9 pages.
PCT International Search Report and the Written Opinion of the International Searching Authority, for PCT Application No. PCT/EP2005/0005907, dated Aug. 1, 2005, 10 pages.
PCT International Search Report and the Written Opinion of the International Searching Authority, for PCT Application No. PCT/EP2005/0011010, dated Jan. 23, 2006, 10 pages.
PCT International Search Report and the Written Opinion of the International Searching Authority, for PCT Application No. PCT/EP2006/0008342, dated Dec. 28, 2006, 8 pages.
PCT International Search Report and the Written Opinion of the International Searching Authority, for PCT Application No. PCT/EP2006/0008358, dated Jul. 5, 2006, 8 pages.
PCT International Search Report and the Written Opinion of the International Searching Authority, for PCT Application No. PCT/EP2008/0008437, dated Sep. 8, 2008, 16 pages.
PCT International Search Report and the Written Opinion of the International Searching Authority, for PCT Application No. PCT/EP2009/0051081, dated Sep. 8, 2008, 16 pages.
PCT International Search Report and the Written Opinion of the International Searching Authority, for PCT Application No. PCT/US2008/0055864, dated Jul. 30, 2008, 6 pages.
PCT International Search Report and the Written Opinion of the International Searching Authority, for PCT Application No. PCT/US2008/0055964, dated Jul. 30, 2008, 6 pages.
PCT International Search Report and Written Opinion of the International Searching Authority for PCT Application No. PCT/EP2005/005033, dated Aug. 4, 2005, 13 pages.
PCT Notification of Transmittal of the International Search Report and Written Opinion of the International Searching Authority for PCT Application No. PCT/EP2005/001171, dated Jan. 27, 2006, 11 pages.
Viola Paul, et al., "Robust Real-time Object Detection", Second International Workshop on Statistical and Computation Theories of Vision—Modeling, Learning, Computing, and Sampling, Vancouver, Canada, Jul. 13, 2001, 25 pages.
Agrawal A. et al., "Removing photography artifacts using gradient projection and flash-exposure sampling" ACM Transactions on Graphics , 2005, pp. 828-835.
Combier, Nathalie et al., "Removal of Defects on Flash Radiographic Images by Fuzzy Combination, Conference: Machine Vision Applications in Industrial Inspection III, http://rlinks2.dialog.com/NASApp/ChannelWEB/DialogProServlet?ChName=engineering", Proceedings of SPIE—The International Society for Optical Engineering, Society of Photo-Optical Instrumentation, 1995, pp. 301-312.
Corcoran, P. et al., "Automated In-Camera Detection of Flash-Eye Defects", IEEE Transactions on Consumer Electronics, 2005, pp. 11-17, vol. 51—Issue 1.
Cucchiara, R. et al., "Detection of Luminosity Profiles of Elongated Shapes", International Conference on Image Processing, 1996, pp. 635-638, vol. 3.
EPO Communication pursuant to Article 94(3) EPC, for European Patent Application No. 05 792 584.4, paper dated May 13, 2008, 8 pages.
European Patent Office, Communication pursuant to Article 94(3) EPC for Application No. 04763763.2, dated Mar. 7, 2008, 7 pages.
European Patent Office, Communication pursuant to Article 96(2) EPC for Application No. 04763763.2, dated Aug. 29, 2006, 4 pages.
Final Office Action mailed Apr. 26, 2010, for U.S. Appl. No. 10/773,092, filed Feb. 4, 2004.
Final Office Action mailed Apr. 26, 2010, for U.S. Appl. No. 11/690,834, filed Mar. 25, 2007.
Final Office Action mailed Apr. 26, 2010, for U.S. Appl. No. 11/772,427, filed Feb. 2, 2007.
Final Office Action mailed Apr. 26, 2010, for U.S. Appl. No. 12/035,416, filed Feb. 21, 2008.

Final Office Action mailed Mar. 24, 2010, for U.S. Appl. No. 11/462,035, filed Aug. 2, 2006.
Final Office Action mailed Nov. 9, 2010, for U.S. Appl. No. 11/462,035, filed Aug. 2, 2006.
Final Office Action mailed Nov. 20, 2009, for U.S. Appl. No. 12/192,897, filed Aug. 15, 2008.
Final Office Action mailed Sep. 1, 2009, for U.S. Appl. No. 11/841,855, filed Aug. 20, 2007.
Gaubatz, Matthew et al., "Automatic Red-Eye Detection and Correction", IEEE ICIP, Proceedings 2002 International Conference on Image Processing, 2002, pp. 1-804-1-807, vol. 2—Issue 3.
Han, T. et al., "Detection and Correction of abnormal Pixels in Hyperion Images", IEEE International Symposium on Geoscience and Remote Sensing, 2002, pp. 1327-1330, vol. 3.
Iivarinen, J. et al., "Content-Based Retrieval of Defect Images, http://www.cs.tut.fi/.about.avisa/digger/Publications/acivs02.pdf", Proceedings of Advanced Concepts for Intelligent Vision, Laboratory of Computer Information Science, 2002.
Ioffe, S., "Red eye detection with machine learning", Proceedings 2003 International Conference on Image Processing, 2003, pp. 871-874, vol. 2—Issue 3.
Ito, M., "An Automated System for LSI Fine Pattern Inspection Based on Comparison of Sem Images and Cad Data", IEEE International Conference on Robotics and Automation, 1995, pp. 544-549, vol. 1.
Jin, B. et al., "Modeling and Analysis of Soft-Test/Repair for CCD-Based Digital X-Ray Systems", Instrumentation and Measurement, IEEE Transactions, 2003, pp. 1713-1721, vol. 52—Issue 6.
Nguyen, Karlene et al., "Differences in the Infrared Bright Pupil Response of Human Eyes", Proceedings of the 2002 symposium on Eye tracking research & applications, 2002, pp. 133-138.
Non-Final Office Action mailed Aug. 30, 2010, for U.S. Appl. No. 11/841,855, filed Aug. 20, 2007.
Non-Final Office Action mailed Aug. 31, 2009, for U.S. Appl. No. 11/462,035, filed Aug. 2, 2006.
Non-Final Office Action mailed Aug. 5, 2010, for U.S. Appl. No. 11/462,035, filed Aug. 2, 2006.
Non-Final Office Action mailed Jul. 14, 2009, for U.S. Appl. No. 12/192,897, filed Aug. 15, 2008.
Non-Final Office Action mailed May 3, 2010, for U.S. Appl. No. 12/187,763, filed Aug. 7, 2008.
"Non-Final Office Action mailed May 4, 2010, for U.S. Appl. No. 12/192,335, filed Aug. 15, 2008.".
Non-Final Office Action mailed Oct. 5, 2009, for U.S. Appl. No. 10/919,226, filed Aug. 16, 2004.
Non-Final Office Action mailed Oct. 7, 2009, for U.S. Appl. No. 12/119,614, filed May 13, 2008.
Non-Final Office Action mailed Oct. 29, 2009, for U.S. Appl. No. 12/194,148, filed Aug. 19, 2008.
Non-Final Office Action mailed Sep. 17, 2010, for U.S. Appl. No. 11/690,834, filed Mar. 25, 2007.
Non-Final Office Action mailed Sep. 21, 2010, for U.S. Appl. No. 10/773,092, filed Feb. 4, 2004.
Notice of Allowance mailed Feb. 1, 2010, for U.S. Appl. No. 10/919,226, filed Aug. 16, 2004.
Notice of Allowance mailed Feb. 19, 2010, for U.S. Appl. No. 12/119,614, filed May 13, 2008.
Notice of Allowance mailed Feb. 19, 2010, for U.S. Appl. No. 12/194,148, filed Aug. 19, 2008.
Notice of Allowance mailed Jun. 27, 2010, for U.S. Appl. No. 12/192,897, filed Aug.15, 2008.
Notice of Allowance mailed Nov. 18, 2009, for U.S. Appl. No. 11/282,954, filed Nov. 18, 2005.
Notice of Allowance mailed Oct. 15, 2010, for U.S. Appl. No. 11/554,539, filed Oct. 30, 2006.
Notice of Allowance mailed Oct. 22, 2010, for U.S. Appl. No. 12/187,763, filed Aug. 7, 2008.
Notice of Allowance mailed Oct. 28, 2010, for U.S. Appl. No. 12/192,335, filed Aug. 15, 2008.
Notice of Allowance mailed Oct. 28, 2010, for U.S. Appl. No. 11/690,834, filed Mar. 25, 2007.
Patent Abstracts of Japan, publication No. 2000050062, Image Input Device, application No. 10-217124, published Feb. 18, 2000, 1 page.

PCT International Preliminary Report on Patentability for PCT Application No. PCT/EP2005/005907, dated Nov. 15, 2006, 8 pages.
PCT International Preliminary Report on Patentability for PCT Application PCT/EP2004/008706, dated Feb. 6, 2006, 7 pages.
PCT International Preliminary Report on Patentability for PCT Application PCT/EP2004/010199, dated Apr. 3, 2006, 7 pages.
PCT International Preliminary Report on Patentability (IPRP) for PCT Application PCT/EP2005/011010, dated Jan. 23, 2007, 18 pages.
PCT International Search Report and Written Opinion of the International Searching Authority for PCT Application No. PCT/EP2004/008706, dated Nov. 19, 2004, 13 pages.
PCT Notification Concerning Transmittal of International Preliminary Report on Patentability, for PCT Application No. PCT/US2007/062090, dated Aug. 28, 2008, 6 pages.
PCT Notification of Transmittal of the International Search Report and the Written Opinion of the International Searching Authority, or the Declaration, for PCT Application No. PCT/EP2006/008358, Dec. 5, 2006, 14 pages.
PCT Notification of Transmittal of the International Search Report and the Written Opinion of the International Searching Authority, or the Declaration, for PCT Application No. PCT/EP2009/005809, dated Nov. 24, 2009, 12 pages.
PCT Notification of Transmittal of the International Search Report and the Written Opinion of the International Searching Authority, or the Declaration, for PCT Application No. PCT/EP2009/006361, dated Nov. 24, 2009, 10 pages.
PCT Notification of Transmittal of the International Search Report and the Written Opinion of the International Searching Authority, or the Declaration for PCT Application No. PCT/US07/62090 issued Mar. 10, 2008, 10 pages.
PCT Notification of Transmittal of the International Search Report and the Written Opinion of the International Searching Authority, or the Declaration, for PCT Application No. PCT/US2008/055964, paper dated Jul. 30, 2008, 8 Pages.
PCT Notification of Transmittal of the International Search Report and the Written Opinion of the International Searching Authority, or the Declaration for PCT/EP/2005/011010, dated Jan. 23, 2006, 14 pages.
PCT Notification of Transmittal of the International Search Report and the Written Opinion of the International Searching Authority, or the Declaration for PCT/EP/2005/05907, dated Aug. 1, 2005, 12 pages.
PCT Notification of Transmittal of the International Search Report and the Written Opinion of the International Searching Authority, or the Declaration, for PCT/EP2004/010199, paper dated Dec. 13, 2004, 13 pages.
PCT Notification of Transmittal of the International Search Report and the Written Opinion of the International Searching Authority, or the Declaration (PCT/EP2006/008342), dated Dec. 28, 2006.
PCT Partial International Search Report for Application No. PCT/EP2009/051081, dated Apr. 29, 2009, 7 pages.
Plotnikov, Yuri et al., "Advanced Image Processing for Defect Visualization in Infrared Thermography, http://citeseer.ist.psu.edu/plotnikov98advanced.html", NASA Langley Research Center, M.S. Posted: ACM Portal, 1998.
Plotnikov, Yuri et al., Winfree, "Visualization of Subsurface Defects in Composites Using a Focal Plane Array Infrared Camera , http://citeseer.ist.psu.edu/357066.html", NASA Langley Research Center, 1999.
Sahba, F. et al., "Filter Fusion for Image Enhancement Using Reinforcement Learning, XP010654204, ISBN: 0-7803-7781-8", Canadian Conference on Electrical and computer Engineering, 2003, pp. 847-850, vol. 3.
Shen, Jianhong, "Inpainting and the Fundamental Problem of Image Processing", 2002, 6 pages.
Smolka, B. et al., "Towards Automatic Redeye Effect Removal, XP004416063", Pattern Recognition Letters, 2003, pp. 1767-1785, vol. 24—Issue 11, North-Holland Publ.
Soriano, M. et al., "Making Saturated Facial Images Useful Again, XP002325961, ISSN: 0277-786X", Proceedings of the SPIE, 1999, pp. 113-121, vol. 3826.

Tan, Yap-Peng et al., "Robust Sequential Approach for the Detection of Defective Pixels in an Image Sensor, http://ieeexplorejeee.org/search/freesrchabstract.jsp?arnumber=758382&isnumber=16342&punumber=6110&k2dockey=758382©ieeecnfs&query=%28%28%28%28images+and+defects+and+correction%29%29%29%29+%3Cin%3E", IEEE International Conference on Acoustics, Speech, and Signal Processing, 1999, pp. 2239-2242, vol. 4.

Tatsutoshi Kitajima (JP04-192681 English Translation; Electronic Camera, Jul. 10, 1992).

Toet, A., "Multiscale Color Image Enhancement, Posted online: 200208-06 18:09:24.0 http://ieeexplore.ieee.org/search/freesrchabstract.jsp?arnumber=146865&isnumber=3917&punumber=1197&k2dockey=146865©ieeecnfs&query=%28%28images+and+defects+and+luminance%29%29+%3Cin%3E+meta data&pos=1", International Conference on Image Processing and its Applications, 1992, pp. 583-585.

Translation of Hiroshi et al. JP05-224271, Mar. 1993, Japan Publication.

United Kingdom Search Report dated May 22, 2007, issued in Application No. GB 0701957.3.

U.S. Appl. No. 10/170,511, filed Jun. 12, 2002, inventor Michael J. DeLuca.

U.S. Appl. No. 10/772,767, filed Feb. 4, 2004, by inventors Michael J. DeLuca, et al.

U.S. Appl. No. 11/217,788, filed Aug. 30, 2005, inventors Eran Steinberg, et al.

Willamowski, J. et al., "Probabilistic Automatic Red Eye Detection and Correction", The 18th International Conference on Pattern Recognition (ICPR'06), 2006, pp. 762-765, vol. 3, IEEE Computer Society.

* cited by examiner

TWO STAGE DETECTION FOR PHOTOGRAPHIC EYE ARTIFACTS

PRIORITY

This application is a Division of U.S. patent application Ser. No. 11/462,035, filed Aug. 2, 2006, which is a Continuation-in-Part of U.S. patent application Ser. No. 11/282,954, filed Nov. 18, 2005, now U.S. Pat. No. 7,689,009, which is hereby incorporated by reference.

BACKGROUND

1. Field of the Invention

The present invention relates to digital image processing, and more particularly to a method and apparatus for detection and correction of red-eye defects and/or other artifacts in an acquired digital image.

2. Description of the Related Art

Redeye is the appearance of an unnatural reddish coloration of the pupils of a person appearing in an image captured by a camera with flash illumination. Redeye is caused by light from the flash reflecting off blood vessels in the person's retina and returning to the camera.

A large number of image processing techniques have been proposed to detect and correct redeye in color images. In general, these techniques typically are semi-automatic or automatic. Semi-automatic redeye detection techniques rely on human input. For example, in some semi-automatic redeye reduction systems, a user must manually identify to the system the areas of an image containing redeye before the defects can be corrected.

Many automatic redeye reduction systems rely on a preliminary face detection step before redeye areas are detected. A common automatic approach involves detecting faces in an image and, subsequently, detecting eyes within each detected face. After the eyes are located, redeye is identified based on shape, coloration, and brightness of image areas corresponding to the detected eye locations. In general, face-detection-based automatic redeye reduction techniques have high computation and memory resource requirements. In addition, most of the face detection algorithms are only able to detect faces that are oriented in an upright frontal view. These approaches generally do not detect faces that are rotated in-plane or out-of-plane with respect to the image plane.

A redeye filter process is illustrated in FIG. 1(a). An input image is first analyzed by a speed optimized redeye detection stage 100 at a pixel level 103 and segmented into candidate redeye regions 104. A further series of falsing and verification filters 106 are then applied to the candidate regions and a set of confirmed redeye regions 108 is thus determined. A correction filter (pixel modifier) 102 is next applied to the confirmed regions and a final image 112, corrected for redeye, is generated.

U.S. Pat. No. 6,407,777 to inventor DeLuca discloses in-camera detection and correction of redeye pixels in an acquired digital image, while US published patent application 2002/0176623 to inventor Steinberg discloses automated real-time detection and correction of redeye defects optimized for handheld devices (each of these is assigned to the same assignee as the present application, as are U.S. application Ser. Nos. 10/919,226, filed Aug. 16, 2004, 10/772,092, filed Feb. 4, 2004, 10/772,767, filed Feb. 4, 2004, and 10/635,918, filed Aug. 5, 2003). US published patent applications 2005/0047655 and 2005/0047656 to Luo et al disclose techniques for detecting and correcting redeye in a digital image and in embedded systems, respectively. The aforementioned patent and published and unpublished patent applications are all hereby incorporated by reference.

Within an image acquisition subsystem such as is embodied in typical digital cameras, a peak computing load and resource requirements occur around the time of image acquisition. Upon receiving an image acquisition request from the user the main embedded processing system refines the image focus and exposure to achieve an optimal main acquired image. This image, in turn, is off-loaded from the main optical sensor of the camera and subjected to further image processing to convert it from its raw format (e.g. Bayer) to a conventional color space such as RGB or YCC. Finally the acquired image is compressed prior to saving it on a removable storage medium such as a compact flash or multimedia card.

The time taken by the camera to recover from the acquisition of a first image and reinitialize itself to capture a second image is referred to as the "click-to-click" time. This parameter is used in the comparison and marketing of modern digital cameras. It is desired for manufacturers to minimize this "click-to-click" time. Thus, it is desired that any additional image processing, such as redeye filtering, which is to be added to the main image acquisition chain should be highly optimized for speed of execution in order to minimize its impact on the click-to-click time of the main system. Such a redeye filter typically compromises its overall performance in terms of accuracy of detection of redeye defects and quality of image correction.

An alternative would be to wait until after the main image has been acquired and perform the redeye filtering at a later time when the camera may execute the filter as a background process, or to perform the redeye filtering off-camera on a desktop PC or printer. There can be drawbacks to this alternative approach, though. First, images are displayed on the acquiring device, immediately after acquisition, with uncorrected redeye defects. Second, when images are accessed in playback mode, there is a further delay while images are post-processed before an image can be displayed. Both drawbacks would create a negative impression on end users.

Further, as most digital cameras store images using lossy compression techniques there can be additional disadvantages with respect to image quality as images are decompressed and recompressed in order to perform redeye detection and correction processes in playback or background modes. Such loss of image quality may not become apparent until later when a user wishes to print an image and it is too late to reverse the process.

If redeye processing is delayed until the images are loaded onto another device, such as a desktop PC or printer, there can be further disadvantages. First, meta-data relating to the acquiring device and its state at the time the image was acquired may not be available to the redeye filter process. Second, this post-processing device performs redeye filtering on the entire image; so that for an embedded device such as a printer that may be relatively constrained in terms of CPU cycles and processing resources for its primary post-processing activity, it would be desirable to optimize the performance of the full redeye filter. It is generally desired to optimize the detection of red-eye defects in digital images for embedded image acquisition and processing systems.

SUMMARY OF THE INVENTION

A digital image acquisition device is provided. An imaging optic and detector is for acquiring digital images including one or more preview images and a main image. A face detector module is for analyzing the one or more preview images to ascertain information relating to candidate face regions therein. An image generating module is for programming the processor to generate a sub-sampled version of the main image. A first speed-optimized red-eye filter is for programming the processor to produce a first set of candidate red-eye regions in a sub-sampled version of the main image based on the candidate face region information provided by the face detector.

An image encoder is for encoding the acquired image. An image compressor is for compressing the main image.

An image store memory is for storing therein said encoded image in association with said first set of candidate red-eye regions for later image processing of the encoded image.

An analysis-optimized red eye filter is for later analysis of a full resolution version of the main image based in part on the previous analysis.

A display is for displaying an image processed by said first speed-optimized red-eye filter.

A signal connection is for transferring images to a PC or other microprocessor-based device, or both, for further image processing.

The face detector may include a search module for detecting candidate face regions and a tracking module for predicting and confirming candidate face regions.

The one or more preview images may include a sub-sampled version of an acquired image.

The candidate face region information includes (i) a list of one or more candidate face regions; (ii) a set of data associated with one or more candidate face regions and statistical data derived from a history of the one or more candidate face regions; or (iii) a predicted location for one or more candidate face regions; or (iv) combinations thereof.

DETAILED DESCRIPTION OF THE PREFERRED EMBODIMENTS

A two-stage redeye filtering process is provided whereby a speed optimized filter performs the initial segmentation of candidate redeye regions and optionally applies a speed-optimized set of falsing/verification filters to determine a first set of confirmed redeye regions for correction. Some of the candidate regions which are rejected during the first stage are recorded and re-analyzed during a second stage by an alternative set of analysis-optimized filters to determine a second set of confirmed redeye regions.

Optionally, the first set of confirmed redeye regions may be passed through the second stage analysis-optimized filters.

In an alternative embodiment, the second stage filter may incorporate an enhanced correction filter which may be optionally applied to the first set of confirmed redeye regions.

A process is provided including implementing a two-stage redeye filter wherein a first redeye filter process, which is optimized for speed, is combined with a second redeye process which is optimized for accurate image analysis. The advantages of a redeye filter implemented within a main image acquisition chain are combined with those of a redeye filter implemented in background/playback mode, while disadvantages generally associated with each of these two approaches are reduced or eliminated.

Figure 1A:
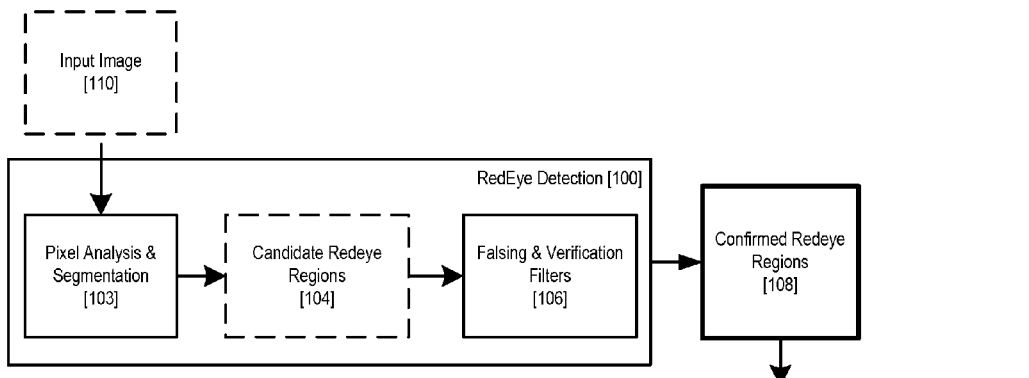
FIG. 1(a) illustrates a redeye process.
Figure 1B:
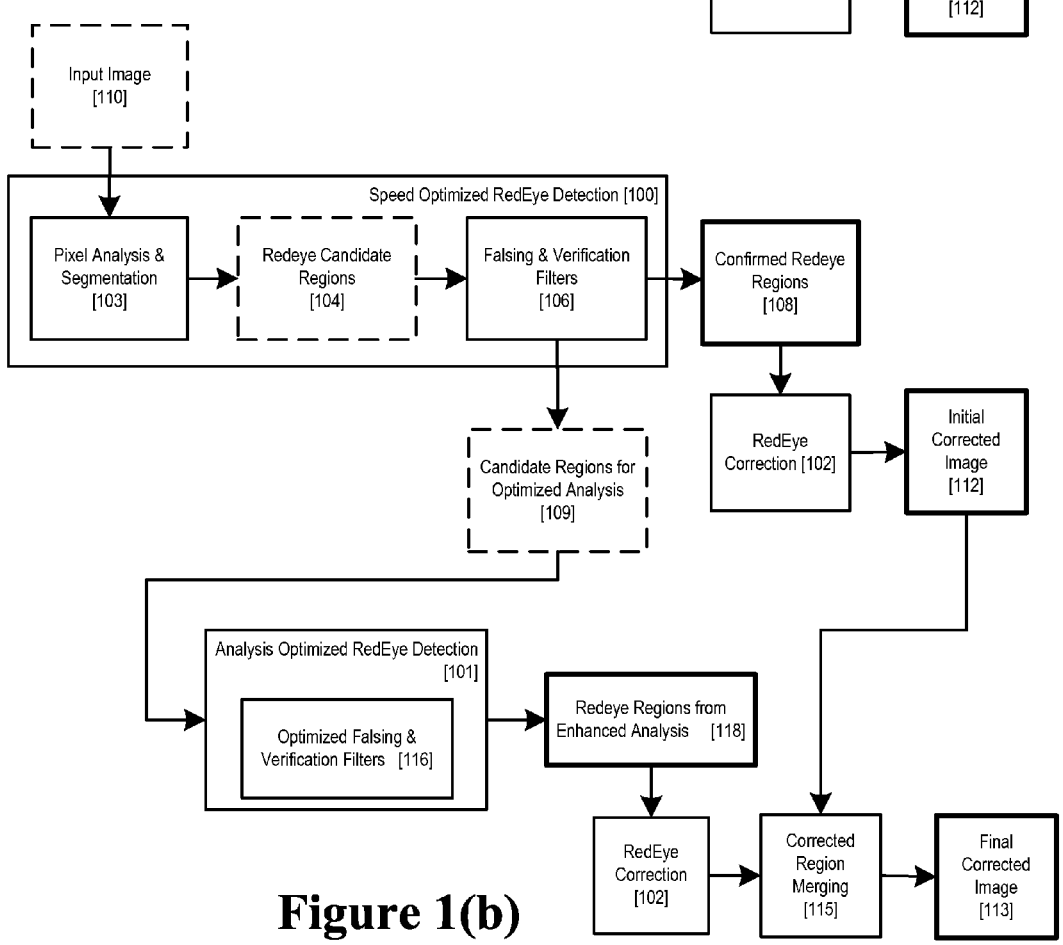
FIG. 1(b) illustrates a redeye process according to a preferred embodiment.

A red eye process in accordance with a preferred embodiment is illustrated in FIG. 1(b). An input image 110 is processed by a pixel analyzer 103, segmented into a set of candidate regions 104 and subsequently passed through a set of falsing & verification filters 106. these components form a speed optimized redeye detection filter 100 corresponding generally to the filter 100 of FIG. 1(a), except that in the embodiment illustrated at FIG. 1(b), filter 100 is modified so that candidate redeye regions which, instead of being ultimately classified as false positives, based on their size or probability being below a predetermined threshold are saved as candidate regions 109 for a subsequent optimized analysis 101.

Thus, in this embodiment the falsing & verification filters 106 generates a set of secondary candidate regions 109 in addition to the set of confirmed redeye regions 108. The set of secondary candidate regions may include members of the original candidate region set 104, which could be neither confirmed nor eliminated by the speed optimized redeye detection process 100. It may also include combined candidate regions in close proximity to each other.

This set of candidate regions 109 is saved either in a RAM buffer, or in non-volatile memory depending on the implementation of the embodiment. Where the data is saved in RAM (or volatile) memory, the image acquisition system applies the second stage redeye filter to the image prior to powering down. The preferred form of storage is in non-volatile memory, or on a removable media card. In other embodiments this data may be stored in the image header with the part-processed image itself.

In this embodiment, a second stage, analysis optimised redeye filter 101 is next applied to the secondary set of candidate regions 109. During the analysis optimized detection process 101, the saved candidate regions 109 are preferably further analyzed at a higher resolution than during the speed optimized process. Thus, the filter 101 includes an analysis optimized set of falsing and verification filters 116, which differ either in their nature or in their operating parameters from the falsing and verification filters 106 employed in the speed optimized analysis. Nonetheless, it will be appreciated that it may be useful to perform one or more intermediate stages of optimized analysis at increasing image resolutions. This will depend on the hardware capabilities of the imaging appliance and the resources available within the image processing subsystems of the imaging appliance.

Second stage analysis may occur in response to a variety of external events. For example, a user may initiate image playback causing this filter 101 to be applied. Alternatively, a camera may signal that it has been idle for a predetermined interval and thus background redeye processing may be initiated. Where a camera can determine its motion from autofocus data, e.g., when a camera is idle such that image focus does not change for a predetermined interval and no user input is received, background image processing including stage-two redeye filtering may be initiated.

After a set of confirmed redeye regions 118 is determined by the second stage redeye filter 101, a correction filter (pixel modifier) 102 is applied and these corrected regions are merged 115 with the initial corrected image 112 to generate a final corrected image 113.

Figure 1C:
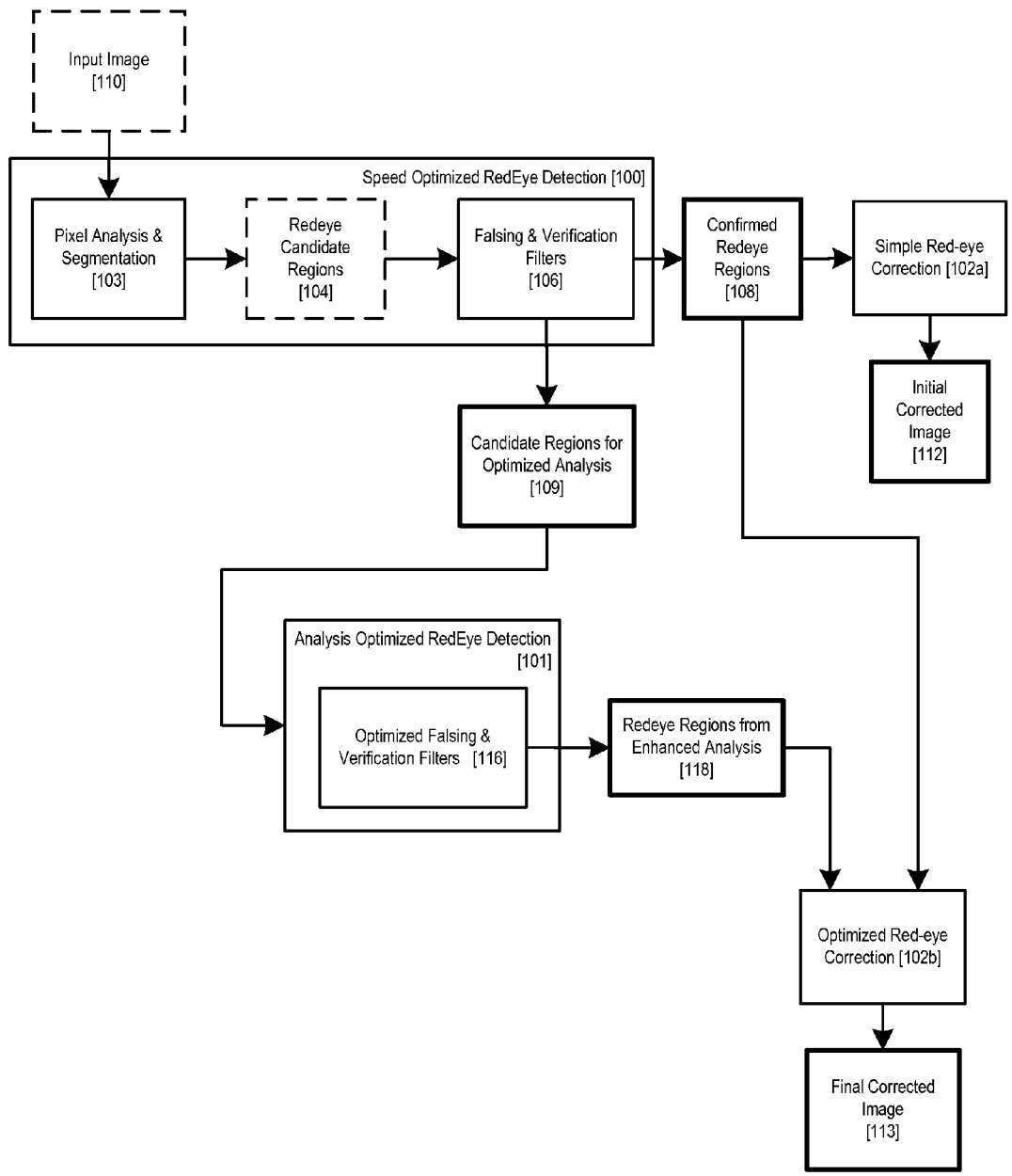
FIG. 1(c) illustrates a redeye process according to an alternative embodiment.

An alternative embodiment is illustrated in FIG. 1(c) which differs from the embodiment of FIG. 1(b) in that a single correction filter (pixel modifier) 102b is applied after the second stage redeye filter 101, rather than merging the initial corrected image 112 with the corrected regions determined by the stage-two filter 101. The filter 102b corrects both the original confirmed redeye regions 108 and the second stage confirmed redeye regions 118 to produce the final corrected image 113.

Figure 2A:
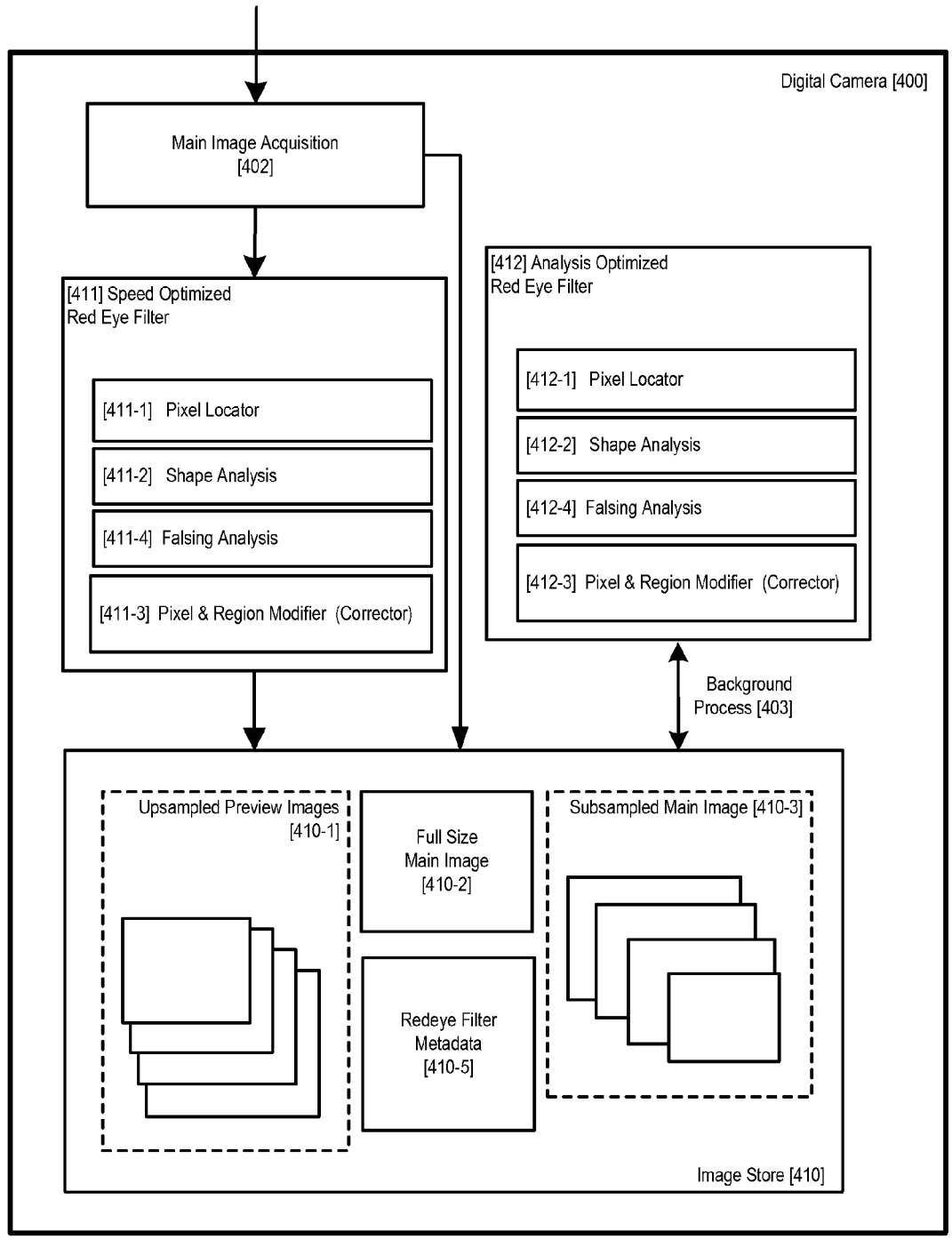
FIG. 2(a) illustrates an embodiment within a digital image acquisition device.

FIG. 2(a) illustrates an embodiment within a digital image acquisition device. The speed optimized redeye filter 411 may contains both detection 411-1, 411-2 & 411-4 and, optionally, correction 411-3 processes. Similarly, the analysis optimized redeye filter 412, which may operate as a background process 403, performs additional refinements to the initial determinations and corrections of the speed optimized filter 411. Data related to these initial determinations is provided by the redeye filter metadata 410-5 which is stored with the acquired image 410-2 in an image store 410.

Figure 2B:
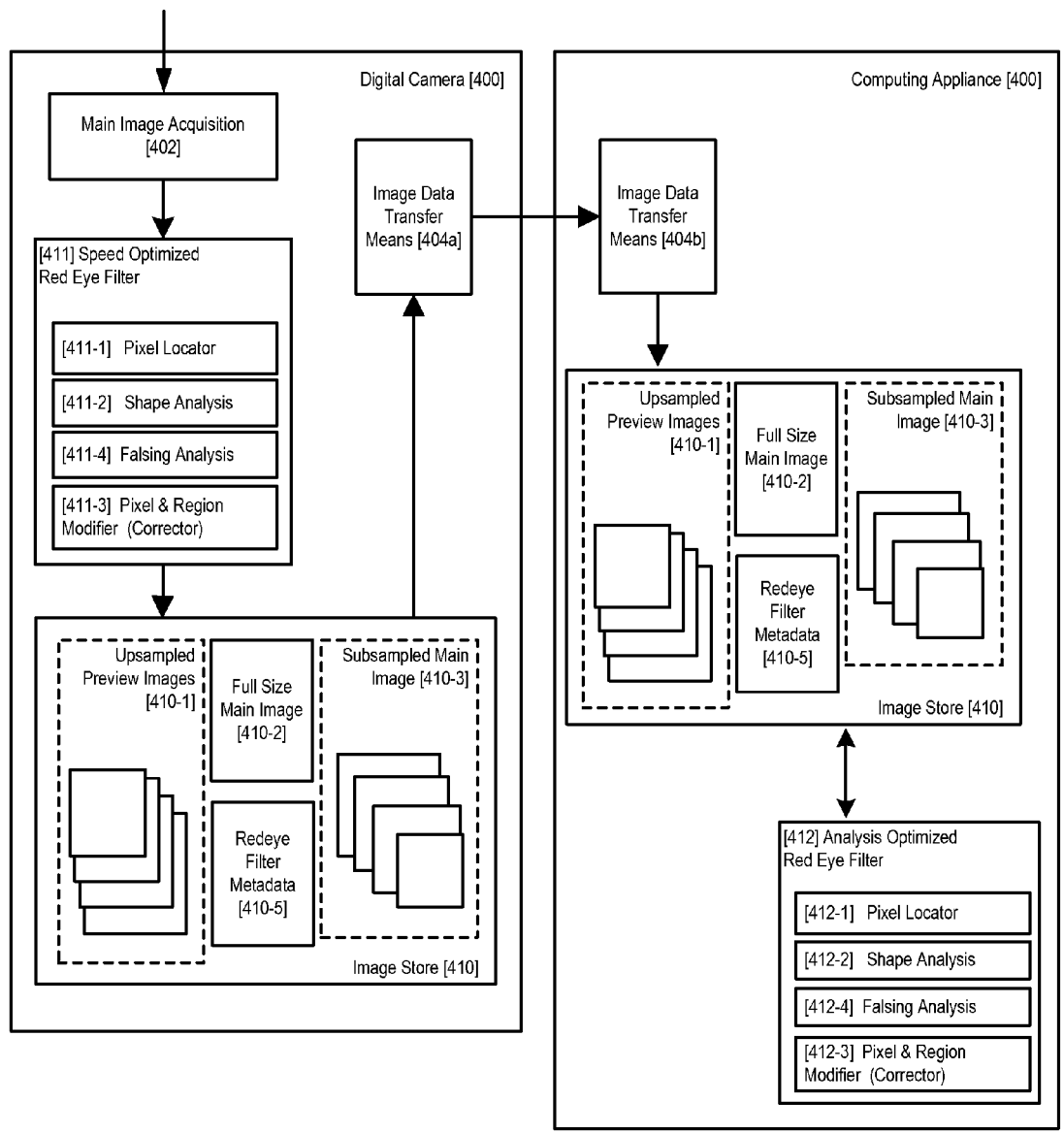
FIG. 2(b) illustrates an embodiment wherein analysis-optimized redeye filtering is performed on a separate device from an acquiring device.

FIG. 2(b) illustrates a variation on the embodiment of FIG. 2(a) wherein the analysis optimized redeye filter is performed on a separate device 400 to the original acquiring device. This may be, for example, a desktop PC, or a printer. In other embodiments the camera may connect directly to a network or web service. The image data transfer means 404a, 404b may be either a point-to-point communications link between the two devices. A removable storage media may be physically exchanged between the two devices, or alternatively both devices may be connected to a common network such as the internet. In other embodiments, the redeye filter metadata 410-5 may be incorporated with the main image data 410-2 by adding the metadata to the JPEG header (see FIG. 3(a)).

Background redeye filters may operate on both the original acquiring device 400 and a separate device 400'. Supporting multiple redeye filters of increasing sophistication can involve exchange and storage of complex and detailed metadata with the image being analyzed and corrected.

For an exemplary, non-exhaustive list of some typical filters that may be found in either the speed or analysis-optimized redeye filters 411, 412, see U.S. published application Ser. No. 10/976,336, filed Oct. 28, 2004, which is assigned to the same assignee as the present application and is hereby incorporated by reference.

In the embodiments above, speed optimized redeye detection 100 is preferably applied to a sub-sampled input image. The confirmed redeye regions 108 from this speed optimized redeye detection 100 are passed to a redeye correction module 102/102a. The corrected redeye image 112 can be displayed on a low-resolution viewing screen of a digital camera immediately after the image acquisition process providing the user with a redeye corrected image almost instantly. However, although this initial corrected image 112 may be adequately corrected, for example, where it is a portrait-style image in which a face occupies most of an image or where large high probability red-eye regions exist, it may not be adequately corrected for images including a large groups of persons, where the candidate redeye regions are smaller or less certain. Accordingly, the second analysis optimized redeye filtering process 101 is preferably implemented after image acquisition but prior to final image 113 display on a larger viewer, or image printing. The analysis optimized redeye detection process 101 and correction process 102 may be advantageously delayed until such high resolution viewing or printing is desired by the end user.

In the embodiments of FIGS. 2(a) and 2(b), the sub-sampled versions of the main image or well as uncorrected full size versions of the main image may be provided directly from main image acquisition device hardware 402 rather than needing to explicitly sub-sample a decoded full size main image.

As in the case of FIG. 1(c), image correction need not be performed on images within the acquisition chain and can in fact be performed in the background on acquired images for which speed optimised redeye detection has been performed in the acquisition chain. This is advantageous in many image acquisition appliances where image compression is often implemented in hardware as part of the main image acquisition chain 401. In this embodiment, only the detection process is actually performed in the acquisition chain. A speed optimized correction or a full analysis optimized redeye filter may be subsequently selected in playback mode either based on a predetermined setting within the camera, or on a user selection at the time of image playback/viewing.

Figure 3A:
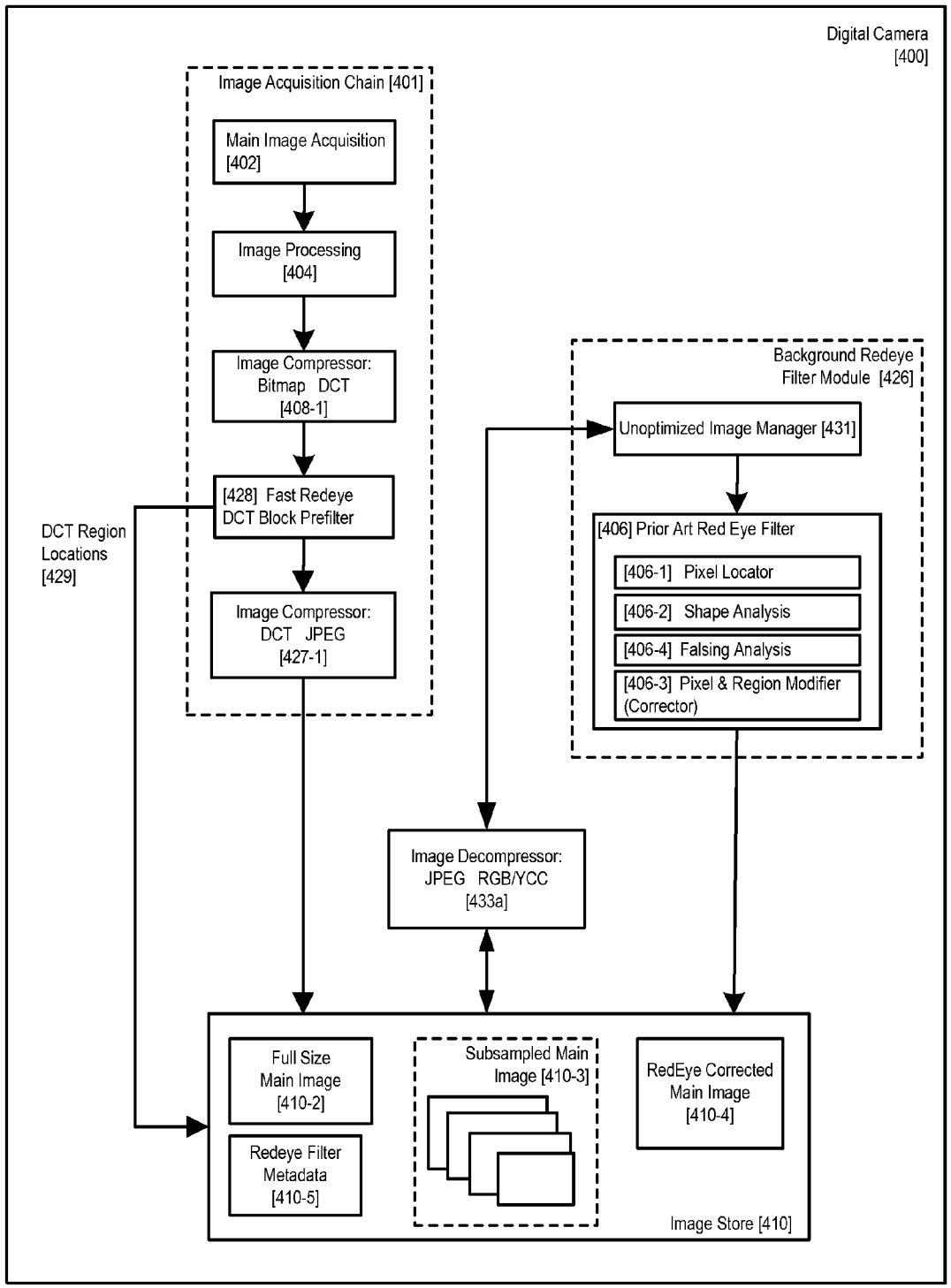
FIG. 3(a) illustrates a process according to an embodiment whereby a speed-optimized redeye detector is applied to a partially compressed DCT block image.

In the embodiment of FIG. 3(a), an acquired raw image 402 is partially processed 404 before being provided to DCT compression block 408-1. This block provides a sub-sampled version of the acquired image and, although not shown, this can be provided to the image store 410 as explained above. A speed optimized redeye detector 428 is then applied to the partially compressed DCT block image and DCT red-eye candidate regions both corrected and suspected uncorrected regions are output for storage in the store 410. An advantage of applying speed optimised correction at DCT block level, rather than at the pixel level, is that the need for an explicit image subsampling step is avoided, yet the benefits of applying redeye analysis to a sub-sampled image as detailed in the prior art cited herein are retained.

The regions output by the DCT prefilter 428, incorporated in the main image acquisition chain 401, can advantageously allow much of the DCT block stream to be bypassed without being processed when an image is subsequently corrected by a filter such as a background filter module 426. This allows either much faster or more detailed analysis and filtering of the DCT blocks which are determined to require processing by an analysis optimized redeye filter 406. Those skilled in the art will realize that further embodiments are possible which separate aspects of both the DCT prefilter and the otherwise conventional type redeye filter 406 between the main image acquisition chain, 401 and a background redeye detection and correction process 426.

Figure 3B:
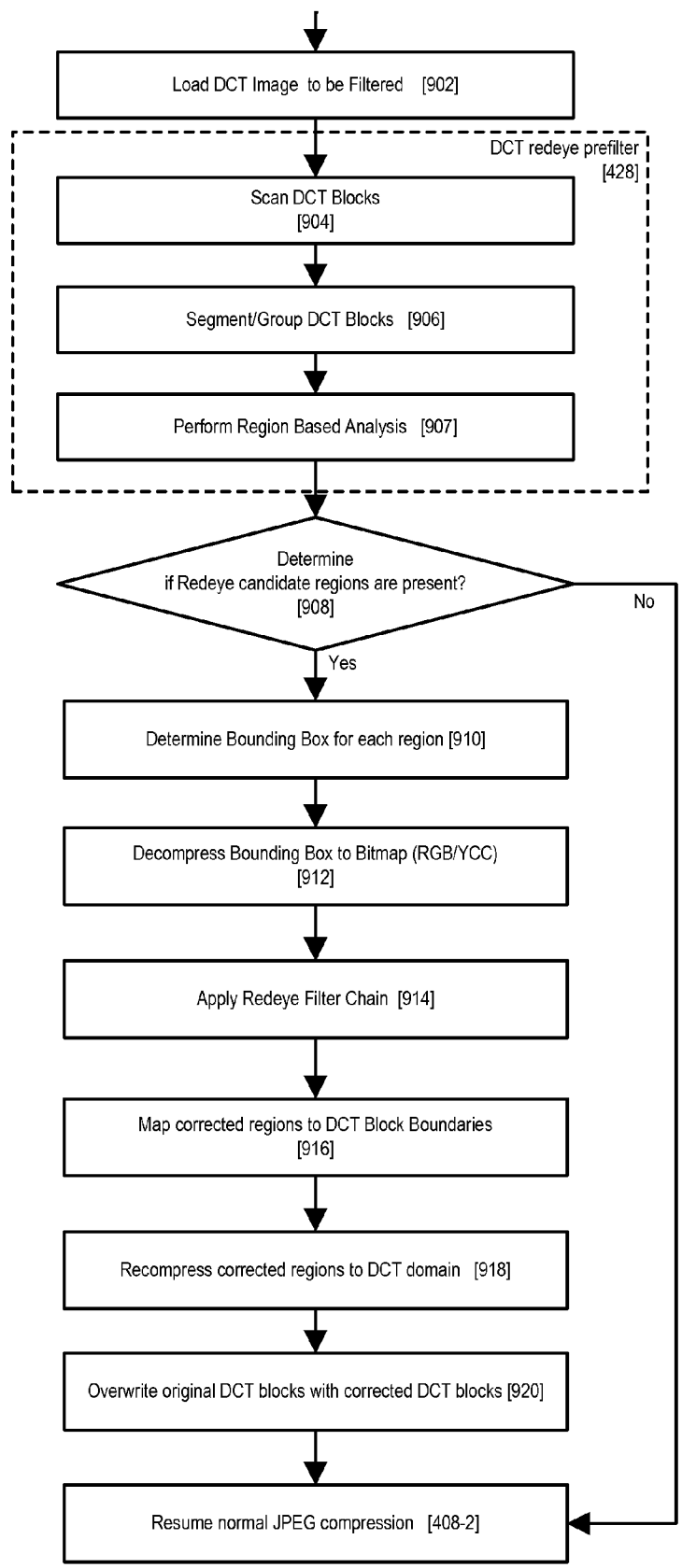
FIG. 3(b) is a workflow diagram of an illustrative embodiment of an improved in-camera redeye detection component employing a redeye DCT prefilter.

FIG. 3(b) shows in more detail the operation of the redeye DCT prefilter 428. This particular example illustrates how the DCT prefilter can integrate with the main image acquisition, processing and compression chain, 402, 404 and 408 of FIG. 3(a). The DCT image to be filtered is first loaded into memory 902 after which the main DCT prefilter 428 is applied. This has three main stages. First, the DCT blocks of the image are scanned 904 and the relevant DCT coefficients are extracted. Depending on the sophistication of the filter, perhaps only the DC components of each DCT block may be utilized in the subsequent analysis. Alternatively, some of the AC components may be extracted in order to allow some texture or sharpness/blur determination as part of the prefilter operation.

In a second principle stage of the DCT prefilter 428, the DCT blocks are segmented and grouped 906 based on a plurality of criteria determined from the coefficients extracted at step 904. A region based analysis is performed 907 in order to determine the final candidate redeye groupings. It is next determined if there are any valid candidate grouping 908 and if not the normal JPEG compression process is resumed 408-2. If candidate regions are determined 908 then a bounding region is determined for each region 910 which is sufficiently large to include various eye-region features which may be used as part of a main redeye filter process 411/412 of FIG. 3(a). If the certainty of the region being a flash eye defect is high enough, a bounding box region may be decompressed to bitmap format 912 and a speed optimized redeye filter chain 914 may be applied to correct that region of the main image 914. The corrected regions in bitmap space are next mapped to an integer number of 8×8 block boundaries and are recompressed 918 and subsequently overwritten 920 onto the DCT domain. Finally, normal JPEG compression is resumed 408-2. As mentioned previously each of the corrected region boundaries and suspected region boundaries may be output for use in later analysis optimized detection and correction.

Figure 3C:
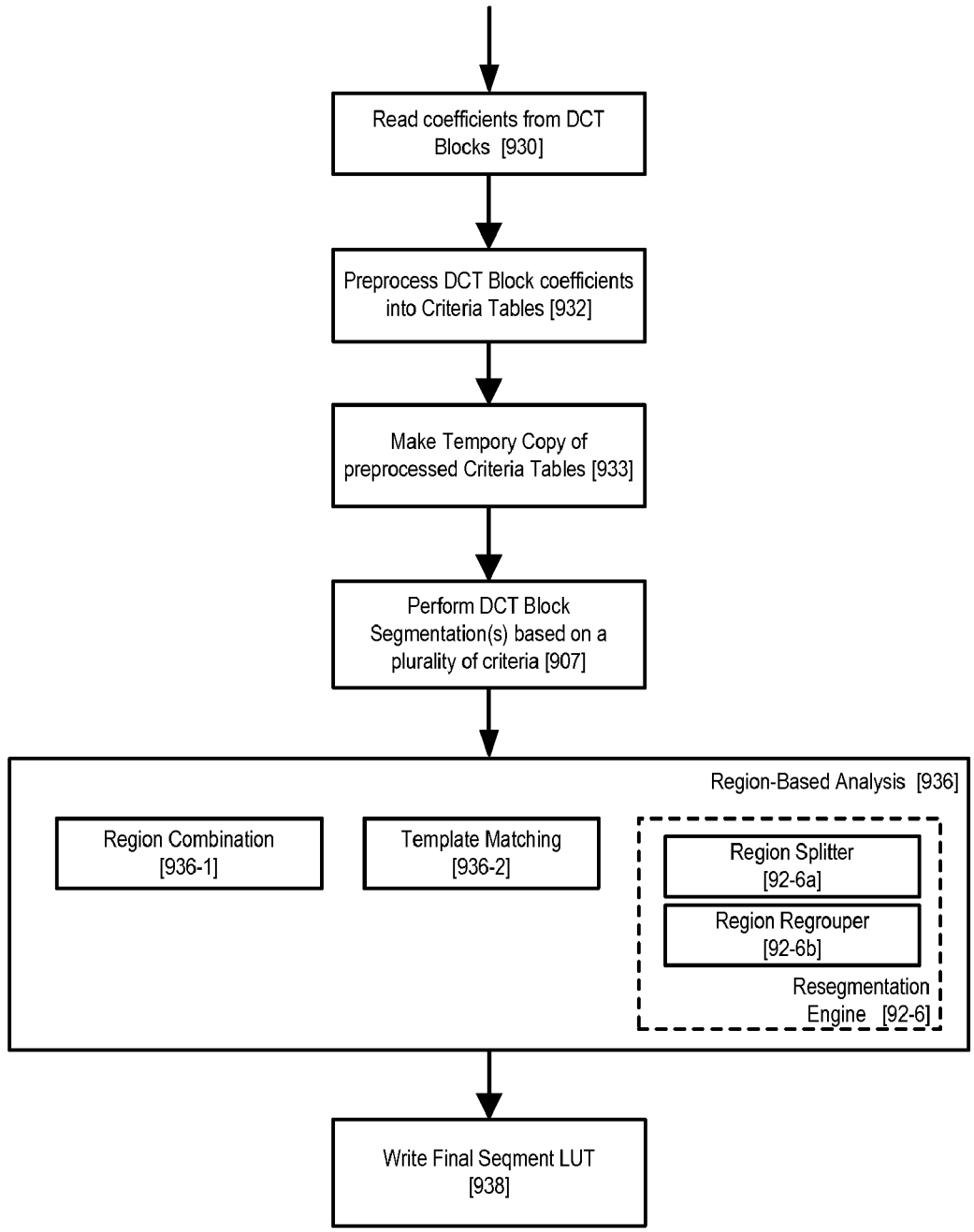
FIG. 3(c) is a workflow diagram of an illustrative embodiment of the redeye DCT prefilter.

FIG. 3(c) shows the region based analysis 907 of FIG. 3(b) in more detail. First, the DCT coefficients are read 930 from a DCT image in temporary memory store. These coefficients are then preprocessed into a set of criteria tables 932. Each table is preferably a numeric table of size N×M where there are N×M DCT blocks in the image being analyzed. As examples, one such table will contain the red chrominance component normalized to emphasize a colour range associated with flash eye defects and derived from the DC coefficients for the luminance (Y) and red chrominance (Cr) components of each DCT block. Another table may contain differential values derived from neighboring DCT blocks and used in edge detection. Yet another table may contain variance values calculated across a set of neighboring DCT blocks. Those skilled in the art will realize that as an implementation of the DCT prefilter becomes increasingly sophisticated that multiple additional criteria may be incorporated into the algorithm.

After the calculations required for each criteria table have been completed 932 they are copied into temporary storage 933 and the prefilter algorithm will next perform a filtering and segmentation step 907 for each of the plurality of criteria tables. This particular step is further detailed in FIG. 3(d) below. Now the prefilter has determined a plurality of sets of DCT block grouping based on the segmentation analysis of a plurality of criteria tables. These groupings are sorted and analyzed to determine a final set of flash defect candidate regions.

This region-based analysis 936 is comprised of a number of alternative techniques which will be known to those skilled in the art. In particular, we mention that regions may be combined both in inclusive, exclusive and less frequently in mutually exclusive combinations 936-1. An alternative approach to region-based analysis will employ template matching 936-2. An example is provided in U.S. Pat. No. 5,805,727 to Nakano, which is hereby incorporated by reference. A sub-region is matched within a DCT image using both coarse and fine template matching techniques based on the DC coefficients of the DCT blocks within the image.

A component of the region based analysis is a re-segmentation engine 92-6 which is responsible for analyzing larger regions which may, in fact, be two distinct overlapping regions, or clusters of smaller regions which may, in fact, be a single larger region. Then once the region based analysis 936 is completed a final LUT containing the list of determined flash defect candidate regions is obtained and written to system memory.

Figures 3D, 3E:
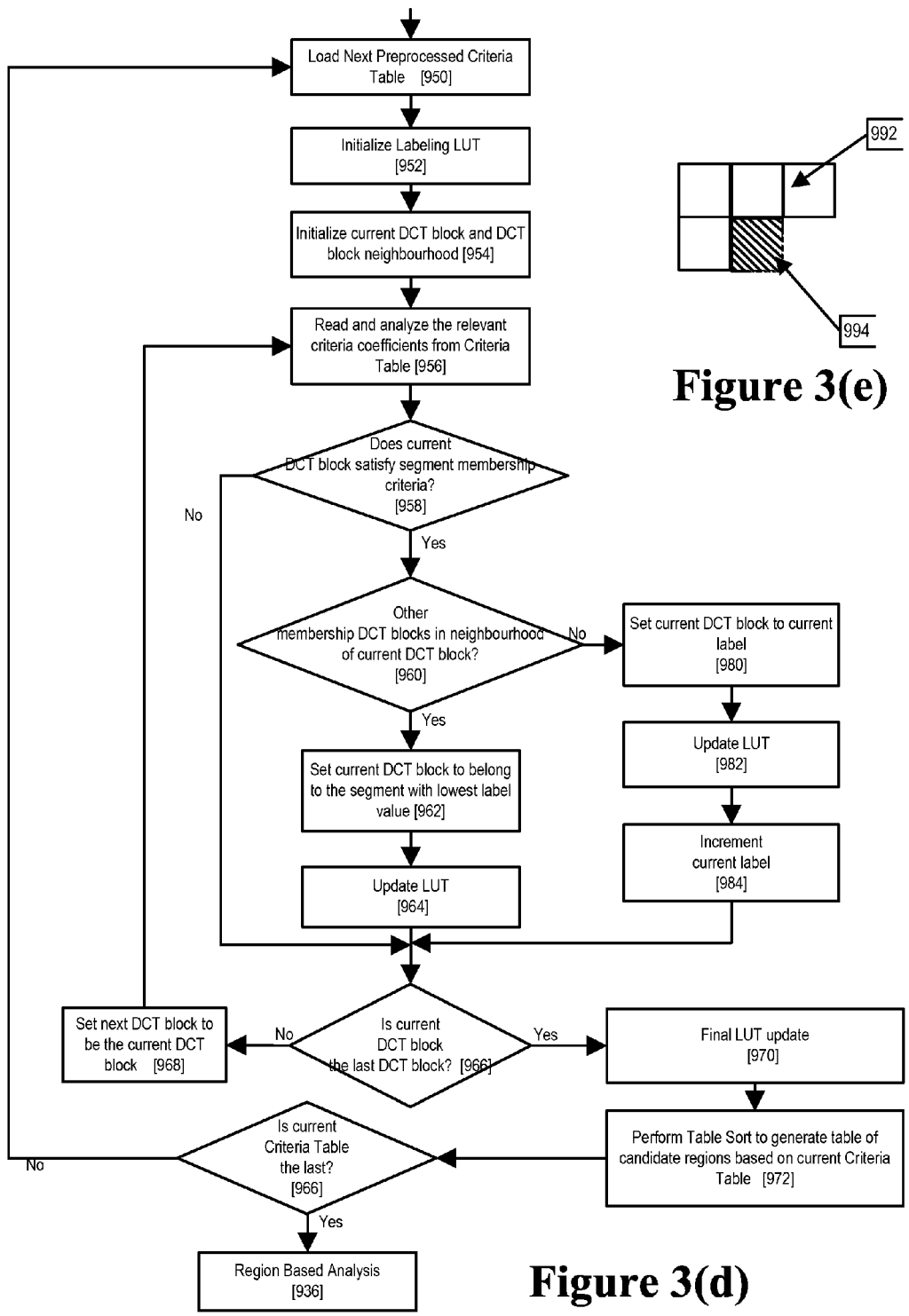
FIG. 3(d) illustrates segmentation of a redeye DCT prefilter.
FIG. 3(e) shows a 4-DCT block neighborhood.

FIG. 3(d) shows the segmentation step 907 of the redeye DCT prefilter in more detail. The next preprocessed criteria table to be processed by the segmentation process is first loaded 950 and the labeling LUT for the region grouping process is initialized 952. Next the current DCT block and DCT block neighborhoods are initialized 954.

FIG. 3(e) shows a diagrammatic representation of a 4-DCT block neighborhood 992 containing the three upper DCT blocks and the DCT block to the left of the current DCT block 994, which is cross-hatched in FIG. 3(e). This 4-block neighborhood 992 is used in the labeling algorithm of this exemplary embodiment. A look-up table, LUT, is defined to hold correspondence labels.

Returning to step 954 we see that after initialization is completed the next step for the workflow of FIG. 3(d) is to begin a recursive iteration through all the elements of the current criteria table in a raster-scan from top-left to bottom-right. The workflow next determines if the current criteria table value, associated with the current DCT block satisfies membership criteria for a candidate redeye region 958. Essentially this implies that the current criteria table value has properties which are compatible with a flash eye defect. If the current criteria table value satisfies membership criteria for a segment 958, then the algorithm checks for other member DCT blocks in the 4-block neighborhood 960. If there are no other member blocks, then the current block is assigned membership of the current label 980. The LUT is then updated 982 and the current label value is incremented 984. If there are other member blocks in the 4-block neighborhood 960 then the current block is given membership in the segment with the lowest label value 962 and the LUT is updated accordingly 516. After the current block has been labeled as part of a flash-eye defect segment 962 or 980, or has been categorized as not being a member of a candidate defect region during step 958, a test is then performed to determine if it is the last DCT block in the image 966. If the current block is the last block in the image then a final update of the LUT is performed 970. Otherwise the next criteria table value is obtained by incrementing the current block pointer 968 and returning to step 958 and is processed in the same manner. Once the final DCT block is processed and the final LUT completed 970, all of the blocks with segment membership are sorted into a labeled-segment table of potential eye-defect segments 972. Another test is then made to determine if this is the last criteria table to be processed 966 and if that is the case then control is passed to the region based analysis step of FIG. 3(c) 936. Otherwise the block segmentor returns to step 950 and loads the next criteria table for processing.

A number of alternative techniques can advantageously be adapted for use within the redeye DCT prefilter. U.S. Pat. No. 5,949,904 to Delp discloses querying image colors within a DCT block. In particular it allows the determination of color within the DCT block from the DC coefficient of the DCT alone. Thus from a knowledge of the DC coefficients alone color matching can be achieved. U.S. Pat. No. 6,621,867 to Sazzad et al discloses determining the presence of edges within DCT blocks based on differences between the DC coefficients in neighbouring DCT blocks.

Now additional image qualities such as texture and image sharpness/blur can be determined through an analysis of additional AC components within a DCT block. Examples of such analysis techniques are described in US patent application No. 2004/0120598 to Feng and US patent application No. 2004/0057623 to Schuhurke et al.

Alternative DCT block segmentation techniques may be employed in other embodiments, and specifically techniques described in U.S. Pat. No. 6,407,777 to DeLuca, U.S. Pat. No. 6,873,743 to Steinberg, and US patent applications 2005/0047655 and 2005/0047656 to Luo et al. All of these patents and published applications are hereby incorporated by reference.

Figures 4A, 4B, 4C, 4D, 4E:
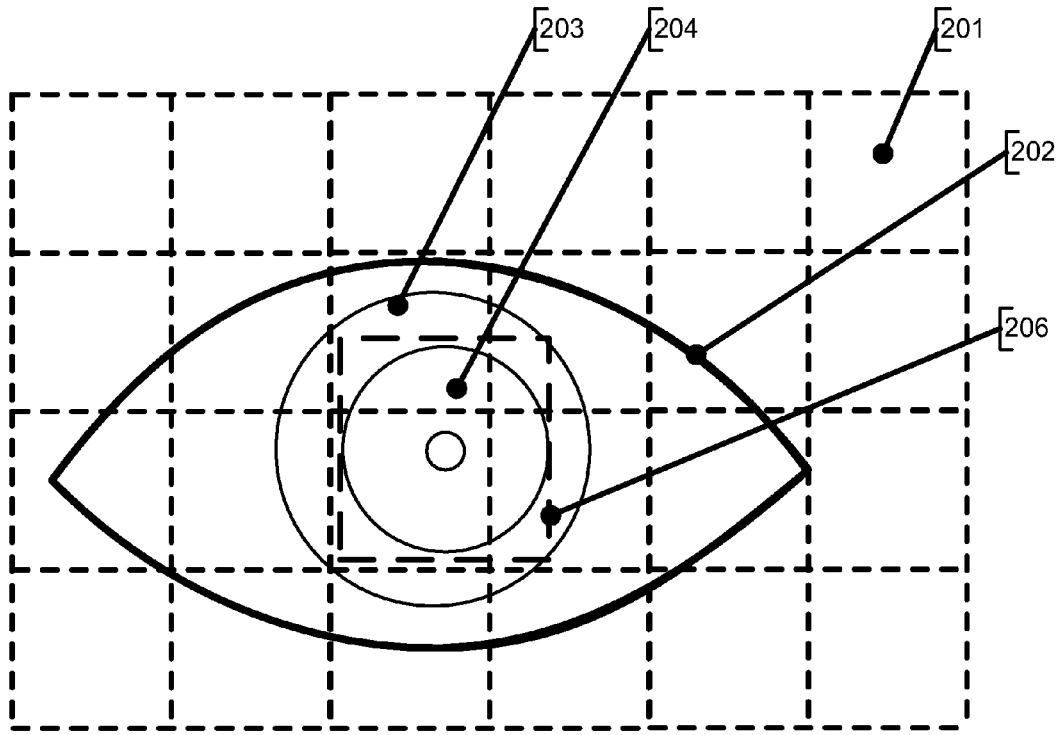
FIG. 4(a) illustrates eye regions mapped onto a rectangular grid.
FIG. 4(b) illustrates the approximate color which will be recorded by a DC coefficient of each DCT block after the image of FIG. 4(a) is transformed into the DCT domain.
FIGS. 4(c), 4(d) and 4(e) illustrate DCT blocks from FIG. 4(a) that can be identified with the colors of a redeye candidate region, an eye-white region and a skin color region, respectively, through the use of an inclusive color determining filter method.

In FIG. 4(a) we show an example of how an outline color template can be constructed for redeye regions. FIG. 4(a) shows an eye regions mapped onto a rectangular grid. Each block of the grid 201 corresponds to an 8×8 pixel block. The main redeye defect 204 is typically surrounded by an iris region 203 and an additional eye-white region 202 and the boundary of the main redeye region, 206 as determined by a redeye filter.

Next, in FIG. 4(b) we show the approximate color which will be recorded by the DC coefficient of each DCT block after the image in FIG. 4(a) is transformed into the DCT domain. The colour combinations shown in FIG. 4(b) are as follows: R is a reddish hue indicative of a flash-eye defect phenomenon; S is a hue indicative of a skin colour; W: indicates a whitish colour associated with the eye-white region; I: is the Iris colour of the eye which can vary significantly from person to person; WS: indicates a block with mixed skin and eye-white; RW: is a block with mixed redeye and eye white; and RI: has a hue which is a mix of red and the Iris color. Now if sufficiently inclusive color filtering is applied to these image blocks it is possible to determine directly from the DC coefficients of the DCT domain image a color map for a typical redeye. FIG. 4(c) illustrates a region which will be determined as red if an inclusive color filter is used. FIGS. 4(d) and 4(e) illustrate this for eye white and skin color regions surrounding the flash eye defect region. This data can, for example, be used to build a set of color templates for a flash eye defect region. By applying other conventional techniques it is possible to determine DCT blocks which contain sharp edges, or transitions between color regions. This can provide additional information to improve the DCT prefilter detection process.

A potential disadvantage in the embodiment of FIG. 3(a) is that it requires the entire image to be decompressed in order to perform the second-step redeye filtering process. As most cameras use JPEG compression which is lossy it is desirable for certain embodiments to implement a lossless embodiment which allows a two-stage redeye process to be applied within an image acquisition appliance without loss of image quality.

Figure 5:
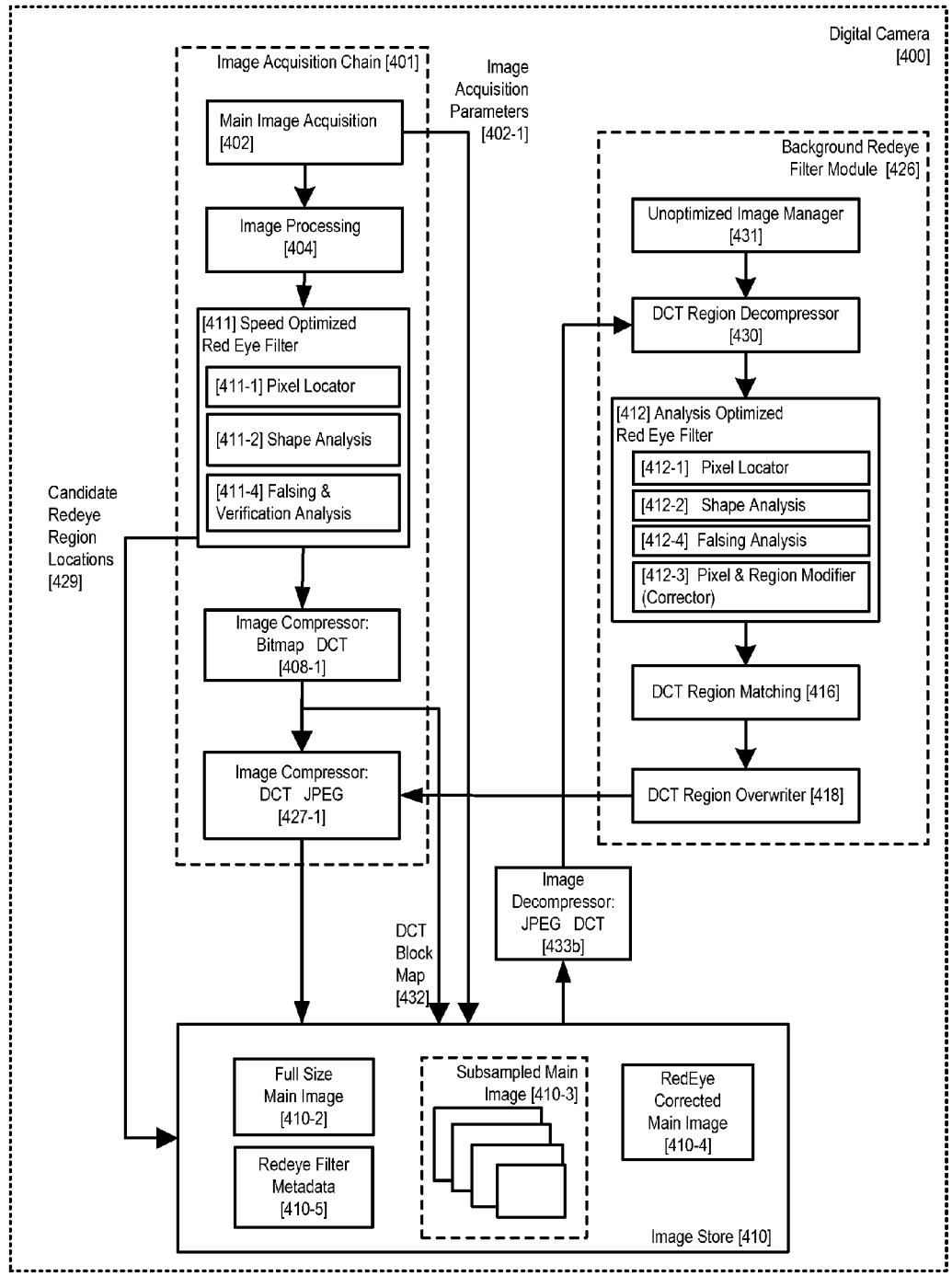
FIG. 5 illustrates a functional implementation of a modified redeye filtering process according to another embodiment.

Accordingly, FIG. 5 illustrates a functional implementation of modified redeye filtering process which allows an analysis optimized redeye detection and correction to occur in playback mode, without loss of image quality. This also allows complex post-processing, to be implemented in incremental steps. Thus, when a camera is idle with respect to user activity, yet is still switched on it may load and commence processing of an image. When user activity recommences the camera can recompress and save the image being processed prior to responding to the user. As the embodiment described below allows lossless saving and restoration of a image within the camera, it thus facilitates incremental process of an image which is not limited to redeye, but may be applied likewise to other in-camera methods such as face detection or recognition.

Various means of sensing user activity may be alternatively employed. One example includes detecting camera motion and optionally correlating this with other in-camera functions such as an autofocus subsystem and a user-interface subsystem. A camera may also incorporate a power-saving mode which determines that the camera has been inactive long enough to disable certain subsystems. When such a mode is activated by user inactivity then additional background image processing can be initiated without interfering with the use of the appliance by the user.

Returning to FIG. 5, an embodiment is illustrated which incorporates a speed-optimized redeye filter 411 in the main image acquisition chain 401. In this exemplary embodiment, the speed optimization of the filter is achieved by implementing a minimal set of falsing and validation filters and no correction process is applied during the main image acquisition chain. In alternative embodiments the speed optimization techniques described in relation to embodiments above may optionally be incorporated or substituted.

After an image is analyzed by this speed optimized redeye filter 411 it is subsequently compressed 427-1 and stored 410. In addition data relating to the location of candidate redeye regions and false positives is recorded and associated with the stored image.

Now when the camera can initiate background processing, as described above, or when the user enters playback mode and selects an image for viewing it will be partially decompressed 433 from JPEG to DCT block form. As this decompression step is lossless there is no loss of quality to the main image which is temporarily stored in memory and passed to a DCT region decompressor 430. This DCT region decompressor uses the data stored and associated with the original image to determine the specific DCT blocks which contain candidate redeye regions, and, optionally, false positive regions which may benefit from additional detection processing if sufficient time & system resources are available.

Each decompressed DCT region is then incrementally filtered by one or more redeye filters to determine corrections which should be applied to said DCT image block.

In certain embodiments, DCT blocks may be decompressed to bitmap format and filtered as a pixel block. In other embodiments adjacent, non-candidate DCT blocks may be included in the decompression 430 and filtering 412 processes. Once a decompressed DCT block region, which may include multiple DCT blocks, has been corrected by the redeye filter 412 then the corrected DCT image segment is passed onto a DCT block matching module 416 which, in addition to checking the alignment of DCT blocks will also check the integration of the corrected DCT blocks within the partially decompressed and temporarily stored DCT block image. When all candidate DCT blocks and any adjacent DCT blocks included in the redeye filter analysis have been corrected they are overwritten onto the partially decompressed and temporarily stored DCT block image by a DCT region overwriter 418 module. The partially decompressed and temporarily stored DCT block image is next passed to the DCT to JPEG image compression module 427-1 and is losslessly compressed back to JPEG format.

Note that in this way the only regions of the image which are decompressed using lossy techniques are those identified by the speed optimized redeye filter 411 in the image acquisition chain. As these image regions are to be corrected the effect of lossy decompression and recompression on them will thus be negligible.

Several further embodiments can be identified. These include (i) saving a copy of the original defect region prior to overwriting the DCT blocks which contain the image defect in the temporary copy of the DCT image. This alternative embodiment supports lossless restoration of the original image. The saved original DCT block region containing the defect can be stored within the header of the JPEG image. In U.S. Pat. No. 6,298,166 to Ratnakar et al., watermark data is incorporated in the image. Thus the corrected image can contain a copy of any original uncorrected regions. Alternatively (ii) multiple alternative correction algorithms can be employed and these may be temporarily copied for later storage in the JPEG header for later selection by an end user through a user interface, either on the camera or subsequently in a computer based image processing application. The overwriting step is optional. If it is used, then certain image analysis criteria can be applied as additional processing either immediately prior to overwriting, or as an integral part of detecting or correcting red-eye or combinations thereof.

Figure 6A:
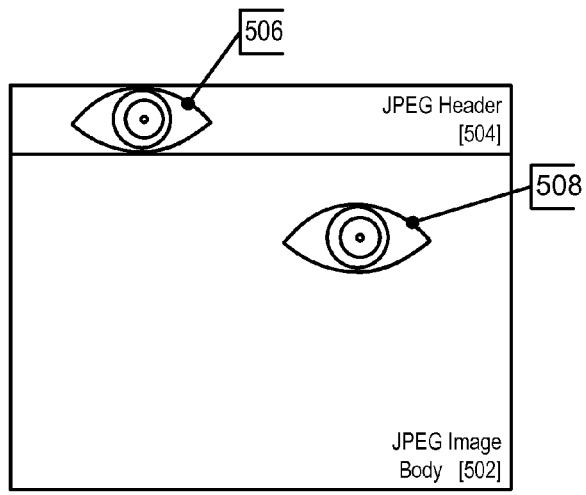
FIG. 6(a) illustrates an original defect region stored in a header and a corrected defect region applied to a main image body.
Figure 6B:
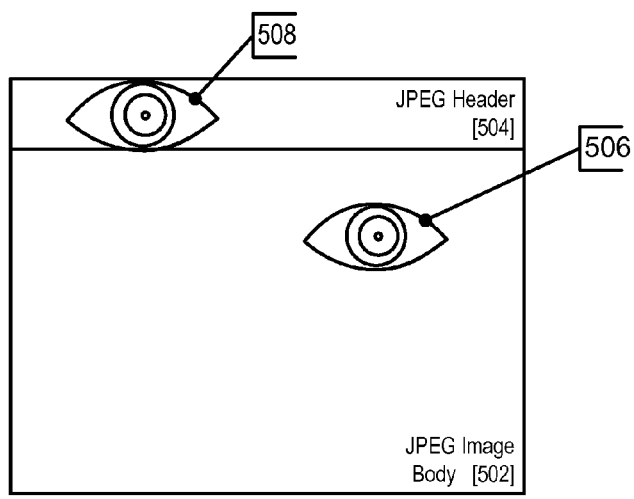
FIG. 6(b) illustrates a corrected defect region stored in the header and the original defect region remaining uncorrected in the main image body.
Figure 6C:
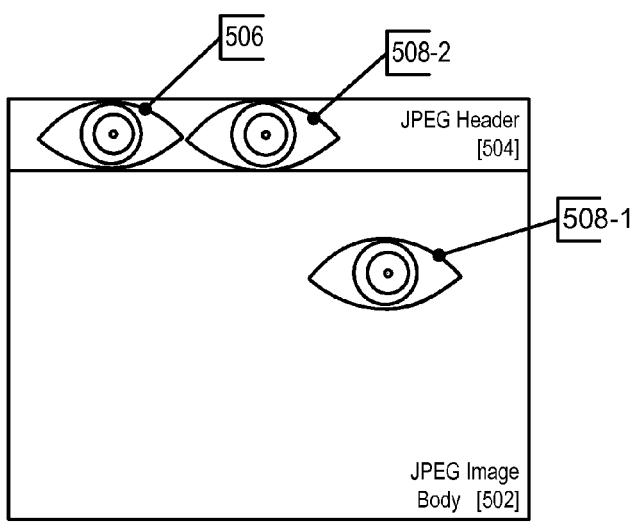
FIG. 6(c) illustrates an original defect region and at least one alternative corrected defect region stored in the header and the optimally determined corrected defect region applied to the main image body.

Further aspects of these embodiments are illustrated in FIGS. 6(*a*)-(*c*). FIG. 6(*a*) illustrates an example of the original defect region 506 stored in the header 504 and the corrected defect region 508 applied to the main image body 502. FIG. 6(*b*) illustrates an example of the corrected defect region 508 stored in the header 504 and the original defect region 506 remaining uncorrected in the main image body 502. FIG. 6(*c*) illustrates an example of the original defect region 506 and at least one alternative corrected defect region 508-2 stored in the header 504 and the optimally determined corrected defect region 508-1 applied to the main image body 502. The graphical representations of "corrected" and "uncorrected" eye regions used in FIGS. 6(*a*)-(*c*) is for illustrative purposes; while graphical eye-regions preferably actually represents a transformed block of DCT coefficients.

In other embodiments, the performance of the fast red-eye filter can be further improved by selectively applying it to a limited set of regions within the acquired image. As it is generally impractical to implement extensive image analysis during the main image acquisition chain, these regions are preferably determined prior to the initiation of the main image acquisition.

One convenient approach to pre-determine image regions which have a high probability of containing red-eye candidates is to perform pre-processing on a set of preview images. Many state-of-art digital cameras acquire such a stream of images captured at video rates of 15-30 frames per second (fps) at a lower resolution than that provided by the main image acquisition architecture and/or programming. A set of 320×240, or QVGA images is typical of many consumer cameras and the size and frame-rate of this preview images stream can normally be adjusted within certain limits.

Figure 7:
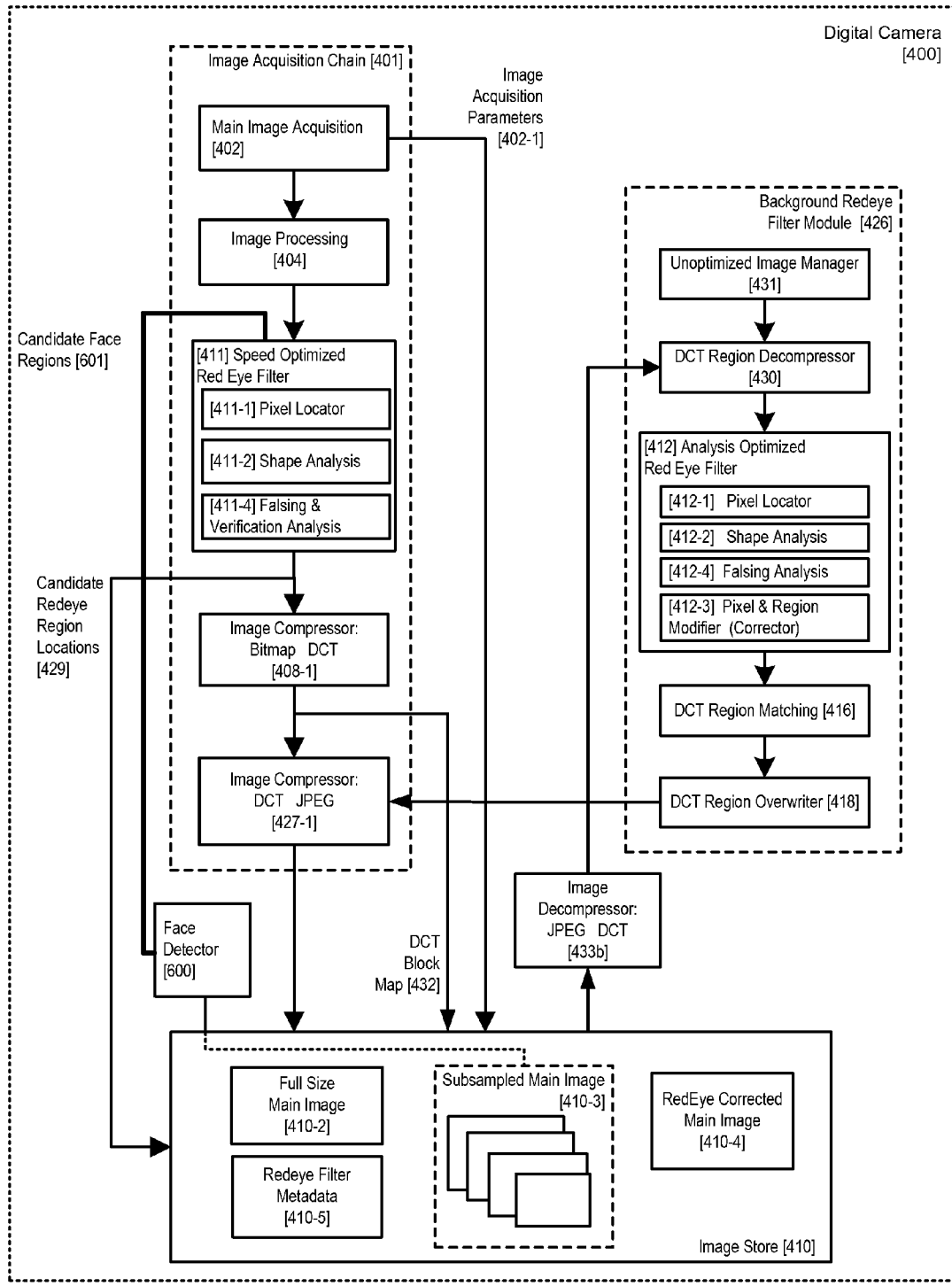
FIG. 7 illustrates a functional implementation of a preferred further embodiment of a redeye filtering process.

In one embodiment, as illustrated in FIG. 7, the digital camera includes a face detector (600) which operates on the preview image stream (410-3). The face detector may have two principle modes: (i) a full image search mode to detect (and confirm) new face-candidate regions (601); and (ii) a main tracking mode which predicts and then confirms the new location of existing face-candidates in subsequent frames of the image stream and compiles statistical information relating to each such confirmed candidate region. Both modes can employ a variety of methods including face detection, skin region segmentation, feature detection including eye and mouth regions, active contour analysis and even non-image based inputs such as directional voice analysis (e.g. US 2005/0147278 to Rui et al which describes a system for automatic detection and tracking of multiple individuals using multiple cues). As the first mode, hereafter referred to as the "seeding mode" is applied to the entire image, it is computationally more intensive and is only applied occasionally, e.g., every 30-60 image frames. As such, new faces appearing in the image will still be detected within a couple of seconds which is sufficient for most consumer applications. The second mode is preferably applied to every image frame, although not all of the analysis cues may be applied on every frame.

Thus in normal operation only the output(s) from the second operational mode of a face tracker algorithm will be available after every frame of the preview image stream. There may be three principle outputs from this second mode: (i) a list of candidate face regions which are confirmed to still contain faces; and/or (ii) a set of data associated with each such confirmed face region including its location within that frame of the image and various additional data determined from a statistical analysis of the history of said confirmed face region; and/or (iii) a predicted location for each such confirmed face region in the next frame of the preview image stream. If item (ii) is used, item (iii) can be optional as sufficient data may be provided by item (ii) for a determination of predicted location.

These outputs from the preview face detector (600) enable the speed optimized red-eye detector 411 to be applied selectively to face regions (601) where it is expected that a red-eye defect will be found.

Techniques are known wherein a face detector is first applied to an image prior to the application of a red-eye filter (e.g. US 20020172419 to Lin et al; US 20020126893 to Held et al; US 20050232490 to Itagaki et al and US 20040037460 to Luo et al.). We emphasize that, under normal circumstances, there is not sufficient time available during the main image acquisition chain, which is operable within a digital camera to allow the application of face detector prior to the application of a red-eye filter. The present embodiment overcomes this disadvantage of the prior art by employing the predictive output of a face tracker module (600). Although the size of the predicted region will typically be larger than the size of the corresponding face region, it is still significantly smaller than the size of the entire image. Thus, advantages of faster and more accurate detection can be achieved within a digital camera or embedded image acquisition system without the need to operate a face detector (600) within the main image acquisition chain.

Note that where multiple face candidate regions (601) are tracked, then multiple predicted regions will have the speed-optimized red-eye filter applied.

The present invention is not limited to the embodiments described above herein, which may be amended or modified without departing from the scope of the present invention as set forth in the appended claims, and structural and functional equivalents thereof.

In methods that may be performed according to preferred embodiments herein and that may have been described above and/or claimed below, the operations have been described in selected typographical sequences. However, the sequences have been selected and so ordered for typographical convenience and are not intended to imply any particular order for performing the operations.

In addition, all references cited above herein, in addition to the background and summary of the invention sections, are hereby incorporated by reference into the detailed description of the preferred embodiments as disclosing alternative embodiments and components.

The invention claimed is:

1. A digital image acquisition device, comprising:
an imaging optic and detector for acquiring digital images including one or more preview images and a main image;
a processor;
a face detector to analyze the one or more preview images to ascertain information relating to candidate face regions therein, the face detector including a search module for detecting candidate face regions;
a face tracking module for predicting and confirming candidate face regions;
an image acquisition chain for image processing to generate a sub-sample resolution version of the main image, including a reduced resolution version of an approximately same scene as the main image;
a first speed-optimized red-eye filter to produce a first set of candidate red-eye regions in the sub-sample resolution version of the main image based on the candidate face region information provided by the face detector;
a display to show a first speed-optimized red eye filtered acquired image thereon; and
a second analysis-optimized red-eye filter configured to be activated after display of said first speed-optimized corrected acquired image on said display, said second filter being activated after a predetermined idle time, said second analysis-optimized red-eye filter being configured to produce, with enhanced accuracy of red-eye detection and/or higher quality of image correction than the first filter, a second set of candidate red-eye regions for viewing at a higher resolution than the first speed-optimized red eye filtered acquired image shown on said display.

2. The device of claim 1, further comprising an image encoder for encoding said acquired image.

3. The device of claim 1, further comprising an image store memory for storing therein an encoded image in association with said first set of candidate red-eye regions for later image processing of said encoded image.

4. The device of claim 1, wherein the second analysis-optimized filter is configured to operate on regions of said array identified as corresponding to regions of said first speed-optimized set of candidate red eye regions.

5. The device of claim 1, further comprising a display for displaying an image processed by said first speed-optimized red-eye filter.

6. The device of claim 1, further comprising an image compressor for compressing said acquired image.

7. The device of claim 1, further comprising a signal connection for transferring said image to a computing appliance for further image processing of said image.

8. The device of claim 1, wherein the one or more preview images comprises a sub-sampled version of an acquired image.

9. The device of claim 1, wherein the candidate face region information comprises:
(i) a list of one or more candidate face regions;
(ii) a set of data associated with one or more candidate face regions and statistical data derived from a history of the one or more candidate face regions; or
(iii) a predicted location for one or more candidate face regions; or
(iv) combinations thereof.

10. A method for filtering a red eye artifact from an acquired digital image, the method comprising:
using a processor;
detecting candidate face regions;
predicting and confirming candidate face regions;
acquiring one or more preview images;
analyzing the one or more preview images to ascertain information relating to candidate face regions therein;
acquiring a main image using a lens and image sensor;
generating and analyzing a sub-sample resolution version of the main image, including a reduced resolution version of an approximately same scene as the main image;
producing a first set of candidate red-eye regions in the main image based on the candidate face region information in the one or more preview images provided by the face detector and on the analysis of the sub-sample resolution version of the main image;
displaying a first speed-optimized red eye filtered acquired image thereon; and
activating a second analysis-optimized filter after displaying said first speed-optimized corrected acquired image, said activating being performed after a predetermined idle time, said second analysis-optimized red-eye filter being configured for enhanced accuracy of red-eye detection and/or higher quality of image correction than the first speed-optimized red-eye filtered acquired image, and thereby producing a second set of candidate red-eye regions for viewing at a higher resolution than the displaying of said first speed-optimized red eye filtered acquired image.

11. The method of claim 10, further comprising encoding said main image.

12. The method of claim 10, further comprising storing an encoded main image in association with said first set of candidate red-eye regions for later image processing of said encoded main image.

13. The method of claim 12, further comprising image processing a full resolution version of the main image with an analysis-optimized red eye filter based only in part on information obtained in the previous analyzing.

14. The method of claim 13, further comprising correcting detected red eye artifacts within the main image, and storing a corrected main image.

15. The method of claim 10, wherein the producing said second set of candidate red eye regions comprises operating the second analysis-optimized filter on regions identified as corresponding to the first set of candidate red eye regions.

16. The method of claim 10, further comprising transferring the main image to a PC or other microprocessor-based device, or both, for further image processing along with information obtained in the previous analyzing.

17. The method of claim 10, wherein the one or more preview images comprises a sub-sampled version of an acquired image.

18. The method of claim 10, wherein the candidate face region information comprises:
(i) a list of one or more candidate face regions;
(ii) a set of data associated with one or more candidate face regions and statistical data derived from a history of the one or more candidate face regions; or
(iii) a predicted location for one or more candidate face regions; or
(iv) combinations thereof.

19. One or more storage devices having program instruction embedded therein for programming a processor to perform the method of any of claims 10-18.

* * * * *